United States Patent
Fukunaga et al.

(10) Patent No.: US 7,359,316 B1
(45) Date of Patent: *Apr. 15, 2008

(54) RECEPTION POINTER PROCESSING APPARATUS IN SDH TRANSMISSION SYSTEM

(75) Inventors: Kenji Fukunaga, Osaka (JP); Takumi Iwai, Osaka (JP); Atsuki Taniguchi, Kawasaki (JP); Kazuo Takatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 852 days.

This patent is subject to a terminal disclaimer.

(21) Appl. No.: 09/615,188

(22) Filed: Jul. 13, 2000

Related U.S. Application Data

(63) Continuation of application No. 08/897,295, filed on Jul. 21, 1997, now Pat. No. 6,118,795.

(30) Foreign Application Priority Data

Nov. 29, 1996 (JP) .................................. 8-320582

(51) Int. Cl.
*H04J 1/16* (2006.01)
*H04J 3/16* (2006.01)

(52) U.S. Cl. ...................................... 370/217; 370/509

(58) Field of Classification Search ................ 370/503, 370/505, 506, 509, 512, 516, 517, 535, 537, 370/538, 539, 907, 504, 476, 470

See application file for complete search history.

(56) References Cited

U.S. PATENT DOCUMENTS

| 5,335,223 A | 8/1994 | Iino |
| 5,461,622 A | 10/1995 | Bleickardt et al. |
| 5,471,476 A | 11/1995 | Hiramoto |
| 5,563,890 A * | 10/1996 | Freitas ....................... 370/476 |
| 5,644,567 A | 7/1997 | Ikeda |
| 5,666,351 A * | 9/1997 | Oksanen et al. ............ 370/474 |
| 5,687,318 A * | 11/1997 | Oksanen et al. ............ 709/234 |

(Continued)

FOREIGN PATENT DOCUMENTS

JP           3-114329           5/1991

(Continued)

OTHER PUBLICATIONS

Japanese Office Action dated Aug. 6, 2002 from corresponding Japanese Application JP 8-320582.

*Primary Examiner*—Andrew C. Lee
(74) *Attorney, Agent, or Firm*—Katten Muchin Rosenman LLP

(57) ABSTRACT

The present invention is a technology concerning a reception pointer processing in an SDH transmission system. The objects of the invention are to identify automatically a frame size (frame composition) of the received transmission frame in the SDH (SONET) transmission system and to perform flexibly and rapidly a reception pointer processing corresponding to the frame size. These objects are realized by providing a reception pointer processing apparatus for performing the pointer processing of the transmission frame transmitted by the SDH transmission system, wherein the reception pointer processing apparatus comprises a pointer processing section for executing the required pointer processing of each unit frame contained in the transmission frame, and a frame composition identification section for identifying automatically the frame composition of the transmission frame based on the pointer processing result of the pointer processing section and for providing the identification result to the pointer processing section.

5 Claims, 30 Drawing Sheets

U.S. PATENT DOCUMENTS

| | | |
|---|---|---|
| 5,712,862 A | 1/1998 | Fujita et al. |
| 5,717,693 A | 2/1998 | Baydar et al. |
| 5,751,720 A * | 5/1998 | Uematsu et al. ............ 370/503 |
| 5,809,021 A | 9/1998 | Diaz et al. |
| 5,872,780 A | 2/1999 | Demiray et al. |
| 6,041,043 A * | 3/2000 | Denton et al. .............. 370/254 |

FOREIGN PATENT DOCUMENTS

| | | |
|---|---|---|
| JP | 6-311145 | 11/1994 |
| JP | 07-50652 | 2/1995 |
| JP | 0750652 | 2/1995 |
| JP | 07-107061 | 4/1995 |
| JP | 08-51406 | 2/1996 |
| JP | 0851406 | 2/1996 |
| JP | 08-79231 | 3/1996 |
| JP | 0879231 | 3/1996 |
| JP | 08-293847 | 11/1996 |
| JP | 08293847 | 11/1996 |

\* cited by examiner

| RAM1 | Bit | 10 | 09 | 08 | 07 | 06 | 05 | 04 | 03 | 02 | 01 | 00 |
|---|---|---|---|---|---|---|---|---|---|---|---|---|
| | DATA | PAIS | CONC | 3-CONSECUTIVE AGREEMENT | | | LOP | | | | STAFF INHIBITION | |

| RAM2 | Bit | 09 | 08 | 07 | 06 | 05 | 04 | 03 | 02 | 01 | 00 |
|---|---|---|---|---|---|---|---|---|---|---|---|
| | DATA | PREVIOUS POINTER VALUE [MSB] | | | | | | | | | [LSB] |

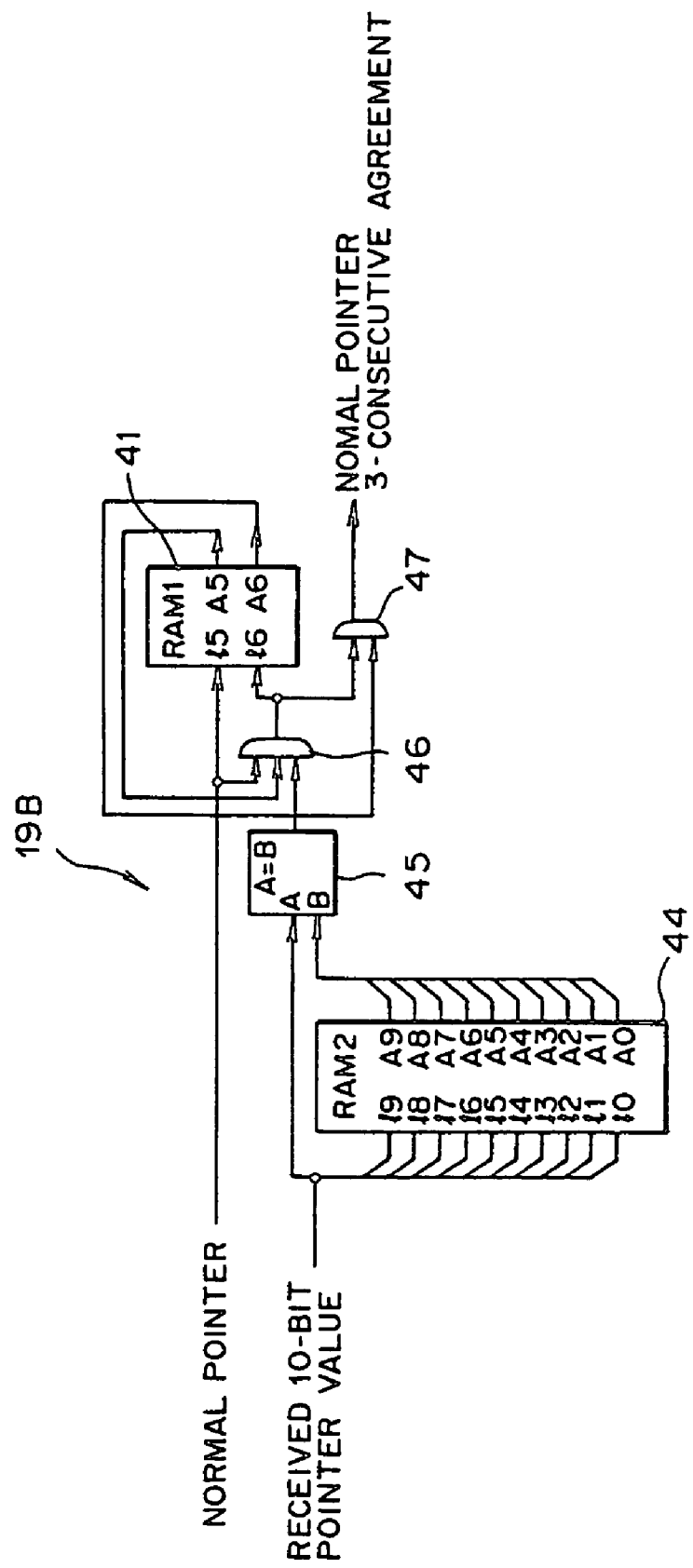

| ITEM | TRANSITION CONTENT | RECEIVED POINTER | | TIMES OF CONSECUTIVE RECEPTION OF FRAME |
|---|---|---|---|---|
| | | LEADING CHANNEL | DEPENDENT CHANNEL | |
| ① | CONC→PAIS | don't care | PAIS-ind | x3 |
| ② | CONC→LOP | don't care | INV-Point[≠CONC-ind] | x8 |
| ③ | PAIS→CONC | don't care | CONC-ind | x3 |
| ④ | | NDF-Enable | don't care | x1 |
| ⑤ | PAIS→LOP | don't care | INV-Point[≠PAIS-ind] | x8 |
| ③ | LOP→CONC | don't care | CONC-ind | x3 |
| ① | LOP→PAIS | don't care | PAIS-ind | x3 |

FIG.22(a)

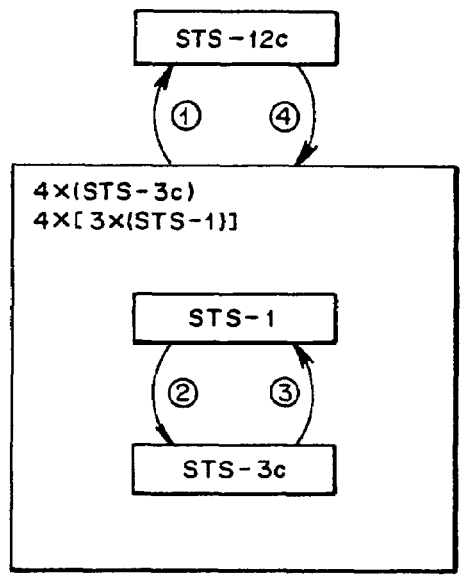

FIG.22(b)

| ITEM | TRANSITION STATE | TRANSITION CONDITION (RECEIVED POINTER) | TIMES OF CONSECUTIVE RECEPTION OF FRAME |
|---|---|---|---|
| ① | →STS-12c | ch01:[NORM-POINT], ch02~12:[CONC-ind] | ×3 |
| ② | →STS-3c | ch(3k+1):[NORM-POINT], ch(3k+2,3):[CONC-ind] (K=0,1,2,3 CONTROLLED INDEPENDENTLY) | ×3 |
| ③ | →STS-1 | ch(3k+1,2,3):[CONC-ind] (K=0,1,2,3 CONTROLLED INDEPENDENTLY) PROVIDED THAT [PAIS,PAIS,PAIS] IS EXCLUDED. CONC-ind REPRESENTS THAT NONE OF PAIS, NORM 3-CONSECUTIVE PROTECTION AND LOP 8-CONSECUTIVE PROTECTION ARE DETECTED | |
| ④ | →4×(STS-3c) 4×[3× (STS-1)] | DETECTION OF ONE OR MORE CONDITION ② OR ③ PROVIDED THAT ch01~03 STS-3c [②] CONDITION DETECTION IS EXCLUDED. | |

RECEPTION POINTER PROCESSING APPARATUS IN SDH TRANSMISSION SYSTEM

This application is a continuation of U.S. application Ser. No. 08/897,295 filed on Jul. 21, 1997 now U.S. Pat. No. 6,118,795, and allowed on Apr. 24, 2000.

BACKGROUND OF THE INVENTION (1) Field of the Invention

The present invention relates to a reception pointer processing apparatus in SDH transmission system, especially a reception pointer processing apparatus used advantageously for the synchronized optical communication network called SONET in the North America.

(2) Description of the Related Art

As it is well-known, in recent optical transmission technology, following the standardization by ITU-T, a transmission unit based on a synchronous transmission system called an SDH (Synchronous Digital Hierarchy) [transmission system based on a synchronous transmission system called an SONET (Synchronous Optical Network) in the North America] is mainly developed in place of a transmission system based on the general asynchronous transmission system called a PDH (Presiochronous Digital Hierarchy).

Moreover, recently, as the circuit capacity (transmission rate) processed by these SDH transmission apparatus or SONET transmission apparatus is increased significantly for instance from 600 Mbps to 10 Gbps, respective transmission apparatus are needed to be increased in capacity and in rate.

FIG. 29 shows an example of a representative SONET (SDH) transmission network. The example shown in FIG. 29 is called PPS (Path Protection Switched) ring network and comprises a plurality of multiplexing apparatus 101 to 106 (node A to F) connected in ring, wherein a multiplexed frame (transmission frame) called STS (Synchronous Transport Signal) in SONET and STM (Synchronous Transfer Mode) in SDH is so composed to communicate all the way switching over Primary/Secondary path depending on the state of the transmission line among respective multiplexing apparatus.

Here, among the respective multiplexing apparatus 101 to 106, multiplexing apparatus 101, 103, 104 and 106 (nodes A, C, D and F) are respectively designed mainly for relaying input transmission frame and various processings will be performed including the replacement processing of an overhead for this multiplexed frame, the pointer replacement processing and others.

On the other hand, the remaining multiplexing apparatus 102 and 105 (nodes B and E) perform respectively overhead termination processing for the multiplexed frame and send to the terminal side, by extracting the lower order group signal [for instance, VT (Virtual Tributary) 1.5, DS1 (Digital Signal level 1) and others], containing in the frame or compose a multiplexed frame by adding the overhead through the multiplexing of the lower order group signal from the terminal side.

In the above composition, the SONET transmission network (PPS ring) shown in this FIG. 29 allows to transmit data (transmission frame) with a high rate all the way conserving an extremely high maintenance and operation capability by relaying or terminating STS frames in multiplexing apparatus 101 to 106 and, at the same time, by transmitting all the way switching over the path to be used (primary/secondary path) conveniently.

The overhead in the SONET (SDH) transmission system is classified into a section overhead (SOH) for transmission line and a path overhead (POH) for path and in the multiplexing process, a method is employed to multiplex by adding the path overhead (POH) to a signal of the lower order group side and by adding the section overhead (SOH) at last.

In the SONET (SDH), at this time, the information (pointer) indicating the frame leading position or the frame composition of respective lower order group signals contained in the multiplexed frame will be indicated in a portion called a pointer byte in the overhead so as to permit to perform the relay or termination processing in the multiplexed frame while adjusting the slight frequency (phase) displacement of lower order group signals contained in the multiplexed frame.

So it becomes very important to process the pointer on data (multiplexed frame) transmission in the SONET (SDH) transmission system.

FIG. 30 is a block diagram showing a composition of essential parts of the multiplexing apparatus 10$i$ (provided that i=1 to 6) in respect of the pointer processing function. In the multiplexing apparatus 10$i$ shown in this FIG. 30, the STS-12 frame after overhead termination processing is received as 8 serial data (78 Mbps) and the pointer processing for this frame (reception/transmission pointer processing) is performed in parallel by the STS-1 frame unit and the apparatus comprises, as shown in FIG. 30, a separation section (DMUX) 111, a reception pointer processing section 112-1 to 112-12, a clock changeover section (ES section) 113-1 to 113-12, a transmission pointer processing section 114-1 to 114-12, a multiplexing section (MUX) 115, an alarm processing section 116 and a PAIS transmission control section 117.

Here, the separation section 111 changes the rate of input data (8 serial data) into the 96 parallel data [S/P (serial/parallel) conversion: 78 Mbps→6 Mbps] to separate into the STS-1 frame of 12 channels; the reception pointer processing section 112-$j$ (provided that j=1 to 12) is designed to perform respectively the reception pointer processing as shown in the following items (1) to (3) for instance in respect of the STS-1 frame [channel data (ch. j)] in its charge and here, the pointer processing will be performed based on the state transition corresponding to the leading channel and the dependent channel individually for each channel according to the frame size (kind) setting [concatenation (CONC) setting: STS-3c/12c] established fixedly from the outside.

(1) Generation of J1 enable signal by detecting the leading position (J1 byte position) of the lower order group signal contained in the channel data from pointer byte (H1, H2 byte; total 16 bits) contained in a data channel.

(2) Detection of the NDF (New Data Flag)-bit, the SS-bit and the 10-bit pointer value of the pointer byte.

(3) Alarm detection of the PAIS (Path Alarm Indication Signal), the LOP (Loss Of Pointer) or the like from the pointer byte.

Here, the NDF-bit is the bit comprising 4 bits to be used for changing immediately the operation pointer value (active pointer value) to a new pointer value and 3 bits or more should correspond with "1001" as the detection condition of NDF enable.

The SS-bit is, on the other hand, the bits (2 bits) used for indicating the frame size of the lower order group signal contained, while 10-bit pointer value is the bits used for indicating in binary code the leading position (offset pointer value) of the contained lower order group signal and they comprise respectively 5 bits increment-bit (I) and decrement-bit (D).

Moreover, the PAIS will be detected when all pointer bytes are "1" and the LOP is detected when invalid pointer is detected sequentially for given number of times (8 times for instance) and, when these anomalies are detected, the PAIS transmission control to the transmission pointer processing section 114-j will be performed by the PAIS transmission control section 117 in order to inform the downstream devices of the transmission date as the AIS state.

The clock changeover section 113-j is designed for clock changing [transmission line→system side clock changeover] the channel data (main signal data) after reception pointer processing in the corresponding reception pointer processing section 112-j respectively while the transmission pointer processing section 114-j is composed to detect NDF enable or to detect staff request, or to detect transmission pointer value for the main signal data after clock changeover processing in the corresponding ES section 113-j respectively.

The multiplexing section 115 is designed to rate-convert (P/S conversion) the main signal (96 parallel data) processed in parallel by the STS-1 unit in the reception pointer processing section 112-j, the ES section 113-j and the transmission pointer processing section 114-j into original 8 serial data before outputting it while the alarm processing section 116 performs the alarm processing corresponding to the frame kind (CONC) setting (STS-1/3c/12c) from outside, based on the PAIS, the LOP transition information detected by respective channel units as mentioned below in the reception pointer processing section 112-j.

The PAIS transmission control section 117 outputs the PAIS transmission control signal when the PAIS or the LOP is detected by the channel unit in the reception pointer processing section 112-j and outputs compulsorily the PAIS transmission control signal to all channels independently of the state of the reception pointer processing section 112-j (PAIS, LOP) upon reception of the higher order group alarm [LOS (Loss Of Signal), LOF (Loss Of Flame), MS (Multiplexing Section) AIS or the like] detected at the reception end on the transmission line frame.

In the multiplexing apparatus 10i composed as mentioned above, first, the input data is separated into the channel data of the STS-1 unit through 8→96 S/P conversion in the separation section 111. Separated data of 12 channels is submitted to the detection of alarm (LOP, PAIS) or the pointer value by the channel data (STS-1) in the reception pointer processing section 112-j before being transmitted as the main signal data (main signal, J1 enable signal) to the clock changeover section 113-j.

In the clock changeover section 113-j, the clock changeover of the main signal and the J1 enable signal input from the reception pointer processing section 112-j to line→system side is processed in parallel for 12 channels by the STS-1 unit and the main signal data after the clock changeover is transmitted to the transmission pointer processing section 114-j.

In the transmission pointer processing section 114-j, the detection of the NDF enable request, the detection of the staff request or the detection transmission pointer value are respectively executed in parallel for 12 channels, by the STS-1 unit, from the main signal data after the clock changeover in the clock changeover section 113-j to insert the pointer byte (H1, H2 byte).

Here, when the PAIS, the LOP at the reception pointer processing section 112-j or LOS, LOF, MS-AIS or other higher order group alarms at the transmission frame reception end are detected, under the control of the PAIS transmission control section 177, the main signal data will all be set to "1".

Then data processed in parallel by the STS-1 unit respectively in the reception pointer processing section 112-j, the clock changeover section 113-j and the transmission pointer processing section 114-j as mentioned before is submitted to 96→8 P/S conversion (6 Mbps→78 Mbps) in the multiplexing apparatus 115 before the transmission.

In other words, the multiplexing apparatus 10i is so composed to separate the STS-N (N=48, 192, . . . ) level multiplexed frame of the STS-12 level or more into the STS-1 frame, minimum path unit for executing in parallel respective reception pointer processings and transmission pointer processings.

To be specific, the reception pointer processing section 112-j (reception pointer processing apparatus) comprises, as shown respectively in FIG. 30, the H1/H2 byte detection section 118, the pointer detection section 119 and the pointer value updating section 120 while the pointer detection section 119 comprises the PAIS detection section 121, the LOP detection section 122, the concatenation (CONC) detection section 123, the NDF enable detection section 124, the normal pointer 3-consecutive agreement detection section 125, the staff detection section 126 and the alarm detection section 127.

Here, the H1/H2 byte detection section 118 detects (latches) the pointer byte (H1 and H2 bytes: 16 bits) corresponding to the concerned channel from the main signal input data (channel data), in the pointer detection section 119, the PAIS detection section 121 detects the PAIS from the H1 and H2 bytes detected in the H1/H2 byte detection section 118, the LOP detection section 122 detects the LOP from the H1 and H2 bytes while the CONC detection section 123 detects concatenation indication (CI) indicating that the input channel data is in the concatenation state (called sometimes "concatenation" hereinafter) such as STS-3c/12c from the H1 and H2 bytes.

On the other hand, the NDF enable detection section 124 detects the NDF enable from the H1 and H2 bytes, the normal pointer 3-consecutive agreement detection section 125 detects reception of the 3-consecutive normal pointers of the same value from the H1 and H2 bytes while the staff detection section 126 detects staff information (INC/DEC) from the H1 and H2 bytes.

Moreover, the pointer value updating section 120 performs the updating processing of the active pointer value based on the results of respective detections in the CONC detection section 123, the NDF enable detection section 124, the normal pointer 3-consecutive agreement detection section 125 and the staff detection section 126 while the alarm detection section 127 detects the alarm information (transition information to PAIS state, LOP state) by the STS-1 unit based on the respective detection result of respective detection sections 122 to 125.

More particularly, the pointer detection section 119 is composed for example as shown in FIG. 31. In this FIG. 31, 128 is a NDF-bit monitoring section for monitoring NDF-bit (No. 1 to 4 bit in a pointer byte) for performing the detection of all "1", detection of "1001" and detection of agreement of 3 or more bits with "1001" while 129 is an SS-bit monitoring section for monitoring SS-bit (No. 5 and 6 bit in a pointer byte) to detect all "1" and to monitor the SS-bit normal reception.

130 is a 10-bit pointer monitoring section for monitoring 10-bit pointer value (No. 7 to 16 bit in a pointer byte) to detect all "1", to monitor "000" to "782" (Offset Value in Range), range showing the normal path accommodation (containing) position and to monitor the comparison result with active pointer value up to the previous frame and I-bit, D-bit for the staff detection respectively.

131 is an AND gate composing the PAIS detection section 121 shown in FIG. 30 with the respective monitoring sections 128 to 130, is designed to output the PAIS indication when respective output becomes all "1" and the pointer byte all "1" by executing logical product of output from respective monitoring sections 128 to 130.

132 is an AND gate composing the CONC detection section 123 with respective monitoring sections 128 to 130, is designed to output the concatenation indication signal when the NDF-bit is "1001", SS-bit normal reception and 10-bit pointer value is all "1" by executing logical product of output from respective monitoring sections 128 to 130.

133 is an AND gate composing the NDF enable detection section 124 with respective monitoring sections 128 to 130, is designed to output the NDF enable signal when the NDF-bit agrees with "1001" for 3 bits or more, SS-bit normal reception and 10-bit pointer value is within the range indicating a normal path containing position ("000" to "782") by executing logical product of output from respective monitoring sections 128 to 130.

134 is one input inversion type AND gate composing the normal pointer 3-consecutive agreement detection section 125 with respective monitoring sections 128 to 130, is designed to output respectively "H" pulse when the NDF-bit is other than agreement with "1001" for 3 bits or more, SS-bit normal reception and 10-bit pointer value indicates a normal path containing position, while it outputs normal pointer 3-consecutive agreement signal when this "H" pulse input for the 3-consecutive frame into a 3-stage protection section 138 mentioned below.

135 is a staff information detection section composing the staff detection section 126 with respective monitoring sections 128 to 130, and is designed to detect INC/DEC staff information in response to I-bit/D-bit inversion number of 10-bit pointer value.

On the other hand, 136 to 139 are respectively the 3-stage protection sections and, here, 136 is used for the 3-frame consecutive reception protection of the PAIS indication, 137 for the 3-frame consecutive reception protection of the concatenation indication, 138 for the 3-frame consecutive reception protection of the normal pointer indication and 139 for the 3-frame staff operation inhibition protection after the staff operation [frame containing position shifting (±1)] respectively.

More particularly, the respective 3-stage protection section 136 to 139 is composed, as shown in FIG. 32 for example, two FF circuits 152, 153 and a 3-input AND gate 154 and the output (protected output) from the AND gate 154 becomes "H" when FF circuits 152, 153 operate by 1 frame and detection pulse (any of PAIS indication, CONC indication, normal pointer indication or staff indication) is input for 3-consecutive frames.

In FIG. 31, 140 and 141 are respectively NOR gates for detecting invalid pointer indicating invalid pointer indication on a pointer byte; NOR gate 140 detects invalid pointer for channels corresponding to the dependent channel at the moment of the CONC setting, and takes the state other than PAIS indication and concatenation indication as invalid pointer. While the NOR gate 141 detects the invalid pointer for channels corresponding to the leading channel at the moment of the CONC setting, and takes the state other than the PAIS indication, the normal pointer indication and the staff indication (INC/DEC) as invalid pointer.

Moreover, 142 is a selector for detecting the invalid pointer of each leading/dependent channel by changing over the output from the respective NOR gates 140, 141 by the CONC setting which is the external input. Here, this FIG. 31 represents a dependent (CONC) channel setting when the CONC setting signal is "H".

144, 145 are 8-stage protection sections for detecting respectively the LOP state (transition condition); 8-stage protection section 144 detects the 8-consecutive invalid pointer while the 8-stage protection section 145 detects the 8-consecutive receptions of the NDF enable (monitoring only NDF-bit) respectively. Here, when the leading channel is set, the logical sum result by OR gate 146 of invalid pointer 8-stage protection and NDF enable reception 8-stage protection is taken as the LOP transition condition, while when the dependent channel is set, as the NDF enable reception 8-stage protection is unnecessary, "L" fixed output is realized by the CONC setting signal to the selector 143.

147 is also a selector for selecting the normal pointer reception condition which is the transition condition from the PAIS or LOP state to the normal (NORM) state, and as transition condition to NORM state is different in the leading channel setting and the dependent channel setting, it is designed to select the detection of NORM×3 in the leading channel setting and the detection of CONC×3 as normal pointer reception condition in the dependent channel setting.

148 is a 3-input OR gate for detecting the transition (cancel) condition from the PAIS state to the NORM (CONC) state or the LOP state by the logical sum of NORM (CONC)×3, NDF enable and LOP, while 149 is a 2-input OR gate for detecting the transition (cancel) condition from the LOP state to the NORM (CONC) state or the PAIS state.

On the other hand, 150, 151 are respectively JK-FF (J-K flip-flop) circuits for determining respective reception state of the PAIS, LOP from PAIS transition condition of output from the 3-stage protection section 136, LOP transition condition of output from 8-stage protection section 144, 145 and detection output of respective state cancel condition of output from OR gate 148, 149.

In the above composition, this pointer detection section 190 may perform accurately respective detection processings of the NDF enable, the normal pointer 3-consecutive agreement reception, the PAIS state, the LOP state or the like for the channel data in its charge by monitoring (detecting) the NDF-bit, the SS-bit and the 10-bit pointer value contained in the input transmission frame pointer byte.

Now, FIG. 33 is a block diagram showing an example of the pointer value updating section 120 shown in FIG. 30. As shown in this FIG. 33, the pointer value updating section 120 comprises a frame counter 154, an offset counter (783-ary counter) 155, a J1 counter (783-ary counter) 156, a selector 157, 164, a latch section 158, a comparison section 159, a decoder 160, an AND gate 161, an enable control section 162 and updating timing generation section 163.

Here, the offset counter 155 is designed to count the input data bit number in synchronous operation with the input data frame pulse, the offset counter 155 counts the bit number of SPE data [pointer offset number ("000" to "782")] in the STS-1 frame while the J1 counter 156 counts 783 bits from the previous frame containing the leading position (J1 enable) for counting the J1 pulse position which is to be the leading position of the next frame. Note that these respective counters 155, 156 are controlled by the frame counter 154.

The selector 157 selects the reception pointer value and the counter value of the offset counter 155 to output as the active pointer value, while the latch section 158 latches the active pointer value from this selector 157. The comparison section 159 compares the offset counter 155 counter value and the active pointer value latched by the latch section 158 to output the J1 pulse if respective values agree.

Moreover, the decoder 160 decodes "782" of the active pointer value while the AND gate 161 takes logical product of offset counter 155 output, the decoder 160 output and the INC indication detected by the staff information detection section 135 shown in FIG. 31 to send the active pointer value updating ("782"→"000") instruction to the updating timing generation section 163 upon the reception of the INC indication when the active pointer value is "782".

On the other hand, the enable control section 162 executes the enable control for the J1 counter 156 for performing "±1" phase control for the J1 pulse output position of the previous frame upon the reception of INC/DEC (staff indication) while the updating timing generation section 163 controls the writing (updating timing) of the active pointer value into the latch section 158 to write the reception pointer value into the latch section 158 as the active pointer value by respective detection timings upon the 3-frame consecutive reception of the NDF enable, the normal pointer indication while, upon the reception of INC/DEC indication, by the J1 pulse timing from the J1 counter, the offset counter 155 counter value is written into as the active pointer value.

The selector 164 selects the active pointer value from the comparison section 159 and the J1 pulse from the J1 counter 156, and is designed to select the J1 pulse from the J1 counter 156 upon the reception of staff indication (INC/DEC) and to select the active pointer value from the comparison section 159 for other cases.

By the composition mentioned before, in this pointer value updating section 120, upon the 3-frame consecutive reception of the NDF enable, the normal pointer indication, the reception pointer value is written into the latch section 158 as the active pointer value by the respective reception (detection) timing, while upon the reception of INC/DEC indication, the offset counter 155 counter value is written into the latch section 158 as the active pointer value according to the J1 pulse timing generated by the J1 counter 156 so as to allow constantly a correct active pointer value updating even when the INC/DEC staff indication is received.

However, the reception pointer processing section 112-*j* (reception pointer processing apparatus) is deprived of a function for automatically judging which is the frame composition (frame size) of the reception data (STS-12 frame) among the STS-1/3c/12c but the reception pointer processing is executed corresponding to the concerned concatenation setting by a fixed frame size setting (concatenation setting) from outside so as to disable the correct reception pointer processing if data other than the set frame size is entered.

Moreover, in the reception pointer processing apparatus, the transmission frame where a plurality of channel data (STS-1 frame) is multiplied is separated for each channel by the separation section 111 before parallel reception pointer processing at STS-1 level bit rate by respective reception pointer processing section 112-*j* so as to require processing circuit corresponding to the number of channels (12 channels for STS-12) increasing substantially both the apparatus size and the power consumption.

SUMMARY OF THE INVENTION

The present invention is devised in view of the problems and has the object that is to provide a reception pointer processing apparatus in an SDH transmission system wherein the frame size (frame composition) of the received transmission frame in the SDH (SONET) transmission system is identified automatically for allowing to perform flexibly and rapidly a reception pointer processing corresponding to such frame size.

To achieve this object, the reception pointer processing apparatus in the SDH transmission system according to the present invention provides a reception pointer processing apparatus for receiving the transmission frame transmitted by the SDH transmission system and for performing pointer processing to the transmission frame, wherein the reception pointer processing apparatus comprises a pointer processing section for executing required pointer processing of each unit frame contained in the transmission frame and a frame composition identification section for identifying automatically the frame composition of the transmission frame based on the pointer processing result of the pointer processing section before providing such identification result to the pointer processing section.

Consequently, according to the reception pointer processing apparatus in the SDH transmission system of the present invention, as the frame composition of received transmission frame may be identified automatically and such identification result may be reflected in the reception pointer processing, the most appropriate reception pointer processing is flexibly performed according to such frame composition constantly, independent of the frame composition of the reception transmission frame. Such composition may meet flexibly larger capacity (higher rate) of transmission frame to be processed, and contributes substantially to the generality of this apparatus and, at the same time, to the improvement of the availability of the transmission frame.

BRIEF DESCRIPTION OF THE DRAWINGS

FIG. 9 (*a*) and FIG. 9 (*b*) are diagrams showing RAM bit-composition according to this embodiment respectively.

FIG. 10 is a block diagram showing the detailed composition of a 3-stage protection section for normal pointer 3-consecutive agreement detection according to this embodiment.

FIG. 16(a) and FIG. 16 (b) are diagrams illustrating respectively the state transition of dependent channel in reception pointer detection by a pointer processing section according to this embodiment.

FIG. 22 (a) and FIG. 22(b) are state transition diagrams illustrating frame size (frame composition) identification processing according to this embodiment respectively.

DESCRIPTION OF THE PREFERRED EMBODIMENTS (a) Description of the Aspect of the Present Invention First, the aspect of the present invention will be described referring to diagrams.

Figure 1:
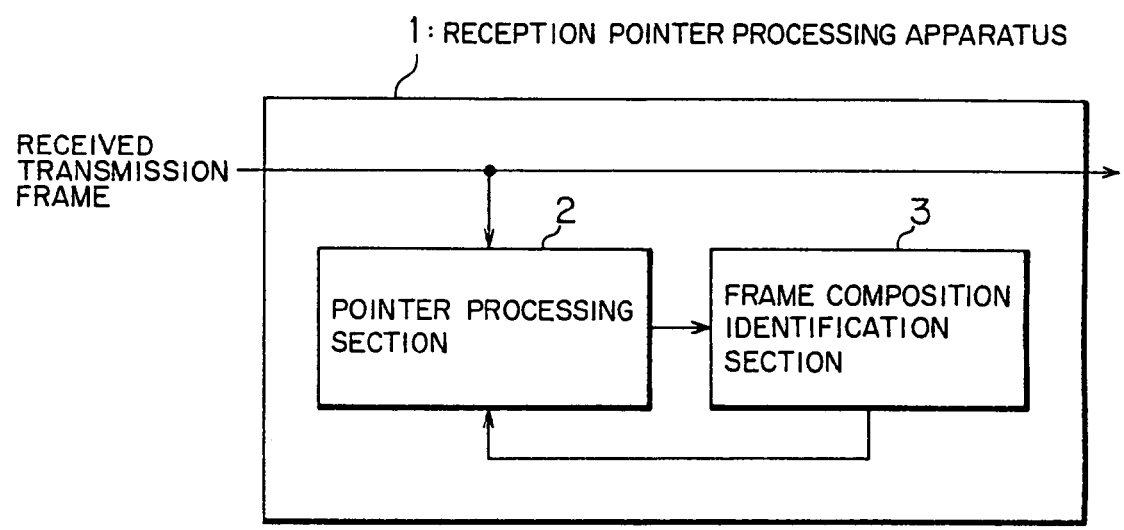
FIG. 1 is a block diagram showing an aspect of the present invention.

FIG. 1 is a block diagram showing the aspect of the present invention. In this diagram, 1 indicates the reception pointer processing apparatus for receiving transmission frame transferred by the SDH transmission system and for performing the pointer processing of such transmission frame, comprising a pointer processing section 2 and a frame composition identification section 3.

Here, the pointer processing section 2 executes the necessary pointer processing of each unit frame contained in the transmission frame while the frame composition identification section 3 identifies automatically the frame composition of the transmission frame based on the result of pointer processing by this pointer processing section 2 and provides such identification result to the pointer processing section 2.

By the above composition, the reception pointer processing apparatus 1 of the present invention may identify automatically the frame composition of received transmission frame by the frame composition identification section 3 and reflect the result thereof by supplying the pointer processing section 2, so the same allows always to perform flexibly an appropriate reception pointer processing corresponding to the frame composition irrespective of the frame composition of the reception transmission frame.

Consequently, it may meet flexibly larger capacity (higher rate) of transmission frame to be processed, and contributes substantially to the generality of this apparatus 1 and, at the same time, to the improvement of the efficiency of use of the transmission frame.

Moreover, if the pointer processing section 2 is so composed to perform the pointer processing serially according to the rate based on the transmission rate of the received transmission frame, the pointer processing will be achieved more rapidly without separating the reception transmission frame by the unit frame (without reducing the transmission rate of transmission frame to the transmission rate of unit frame), permitting to reduce substantially the scale of this apparatus 1 and, at the same time, to reduce substantially its power consumption.

Moreover, if the frame composition identification section 3 is also composed to perform the identification processing serially according to the rate based on the transmission rate of the received transmission frame, the identification processing will be achieved more rapidly without separating the reception transmission frame by unit frame (without reducing the transmission rate of transmission frame to the transmission rate of unit frame), permitting to reduce substantially the scale of this apparatus 1 and its power consumption.

To be more specific, the pointer processing section 2 comprises, for instance, a pointer detection section for detecting the NDF-bit, the SS-bit and the pointer value contained in the pointer byte of the transmission frame and a concatenation detection section for detecting that the received transmission frame is in the concatenation state composed by linking a plurality of unit frames when the result of respective detection in this pointer detection section satisfies a given condition.

By this composition, this pointer processing section 2 can surely detect, at least, if the received transmission frame is composed of a plurality of respectively independent unit frames or if it is composed of frame of the concatenation state where a plurality of unit frames are linked. As the consequence, the detection accuracy in respect of the concatenation state of transmission frame may be improved substantially.

At this time, as the given condition, if a state wherein the NDF-bit indicates the NDF enable, the SS-bit indicates a normal value and, at the same time, the pointer value indicates all "1" is made to be detected, the concatenation detection section may be realized with a very simple composition and, moreover, as the NDF enable is adopted as the detection condition, the concatenation state may always be detected precisely by preventing securely erroneous reception of transmission frame due to noise on the transmission line.

Here, the pointer processing section 2 may comprise the pointer detection section for detecting the SS-bit contained in the received transmission frame pointer byte and, at the same time, this pointer detection section may be composed to be able to modify the detection condition of the SS-bit.

By this composition, this pointer processing section 2 may always detect the correct SS-bit irrespective of the transmission system, because it may modify the SS-bit detection condition to the SS-bit detection condition appropriate for the transmission system, even if, for instance, a transmission frame of a transmission system whose SS-bit definition (detection condition) is different is received.

So it may further contribute to the improvement of the generality of this apparatus 1.

Moreover, the pointer processing section 2 may comprise the pointer detection section for detecting the NDF-bit, the SS-bit and the pointer value contained in the received transmission frame pointer byte and an invalid pointer detection section for detecting that the received pointer byte is the invalid pointer byte based on respective detection results in this pointer detection section and, at the same time, this invalid pointer detection section may be composed to change over the valid pointer byte detection condition according to the transmission frame reception condition and the frame composition for detecting as the invalid pointer byte those pointer bytes not meeting with such detection condition.

By this composition, the pointer processing section 2 may detect the invalid pointer byte by changing over the pointer byte state (detection condition) to be validated according to the transmission frame reception state and the frame composition so as to detect the invalid pointer byte under appropriate conditions corresponding to the frame composition of the transmission frame.

As the consequence, the pointer processing section 2 may always detect the correct invalid pointer byte contributing substantially to the improvement of the reliability of this apparatus 1.

It should be noted that, in this case, by providing a protection section for outputting the LOP state indication on the detection of the invalid pointer byte for a given number of times in the invalid pointer detection section, it becomes possible to output always a correct LOP state indication irrespective of the frame composition of the transmission frame, so this contributes all the more to the improvement of the reliability of this apparatus 1.

Moreover, the pointer processing section 2 may comprise the pointer detection section for detecting the NDF-bit, the SS-bit and the pointer value contained in the received transmission frame pointer byte and the AIS detection section for detecting the AIS state indication of the received pointer byte based on respective detection results in this pointer detection section and, at the same time, this AIS detection section may be composed to output the AIS state indication detection signal as it is to the outside upon the detection of the AIS state indication.

By this composition, this pointer processing section 2 may output the AIS state indication detection signal as it is to the outside upon the detection of the AIS state indication allowing to inform the outside rapidly of the AIS state so as to contribute significantly to the improvement of the maintenance and operation reliability of the whole SDH transmission network.

On the other hand, the pointer processing section 2 may comprise the pointer detection section for detecting the NDF-bit, the SS-bit and the pointer value, contained in the received transmission frame pointer byte and the AIS detection section for detecting the AIS state indication of the received transmission frame pointer byte based on respective detection results in this pointer detection section and, at the same time, when the received transmission frame is composed to include a leading frame and a dependent frame linked to this leading frame, it may be composed to cancel the AIS state of both the leading frame and the dependent frame upon the reception of the NDF enable of the transmission frame pointer byte during the AIS state processing in response to the AIS state indication of the transmission frame from the AIS detection section.

By this composition, this pointer processing section 2 cancels the AIS state of both the leading frame and the dependent frame in the reception transmission frame upon the reception of the NDF enable of the transmission frame pointer byte during the AIS state processing so as to prevent such problem that a part (dependent frame) of data to be considered as one frame by linkage remains in the AIS state though the AIS state indication is canceled, improving further the reliability of this apparatus 1.

In this case, this pointer processing section 2 may invalidate the reception itself of the AIS state indication by composing so as to invalidate the AIS state indication output from the AIS detection section upon the reception of the NDF enable of the received transmission frame pointer byte allowing to cancel more securely the AIS state of both the leading frame and the dependent frame to perform the AIS state processing more precisely.

By the way, this reception pointer processing apparatus 1 may be composed to perform compulsively the AIS state transition processing upon the reception of higher order group alarm information of the reception transmission frame by the pointer processing section 2.

By this composition, in this apparatus 1, the reception pointer processing changes to the AIS state with the alarm processing upon the reception of higher order group alarm information of the reception transmission frame so as to prevent securely such problem that the pointer processing becomes unstable as the reception pointer processing is executed during the AIS alarm processing allowing, in this case also, to improve significantly the reliability of this apparatus 1.

The pointer processing section 2 may also comprise the pointer value updating section for updating pointer value contained in the transmission frame pointer byte and this pointer value updating section may be composed to perform updating processing of the pointer value serially according to a rate based on the transmission rate of the received transmission frame and, through this composition, this pointer processing section 2 may update pointer value rapidly without separating reception transmission frame by unit frame (without reducing the transmission rate of transmission frame to the transmission rate of unit frame).

As the consequence, the processing capacity of this apparatus 1 may be improved substantially.

Additionally, this reception pointer processing apparatus 1 may be composed so that the pointer processing section 2 comprises the pointer detection section for detecting transmission frame pointer byte and that the frame composition identification section 3 comprises an identification condition setting section for setting an identification condition for each frame composition of the transmission frame and a frame composition determination section for determining that the transmission frame is of the frame composition corresponding the identification condition, when the detection results of the pointer detection section meet the identification condition set by this identification condition setting section.

By such composition, this apparatus 1 may easily identify the frame composition of the reception transmission frame by determining which condition among identification conditions set for each frame composition of the transmission frame does the received transmission frame meet, so the permanently correct automatic identification of the frame composition of the received transmission frame may be realized.

Here, the frame composition determination section may be composed to determine, when the detection results of the pointer detection section meet the first identification condition set by the identification condition setting section and then the second identification condition, that the received transmission frame is of the frame composition corresponding the second identification condition and, at the same time, to cancel the determination result under the first identification condition. By this composition, this frame composition determination section may always generate only one confirmation and judgement about the frame composition of the received transmission frame without generating a plurality of determination results in duplication.

As the consequence, the reliability of this identification processing may be improved substantially.

(b) Description of an Embodiment of the Present Invention

Now, an embodiment of the present invention will be described referring to the attached drawings.

Figure 2:
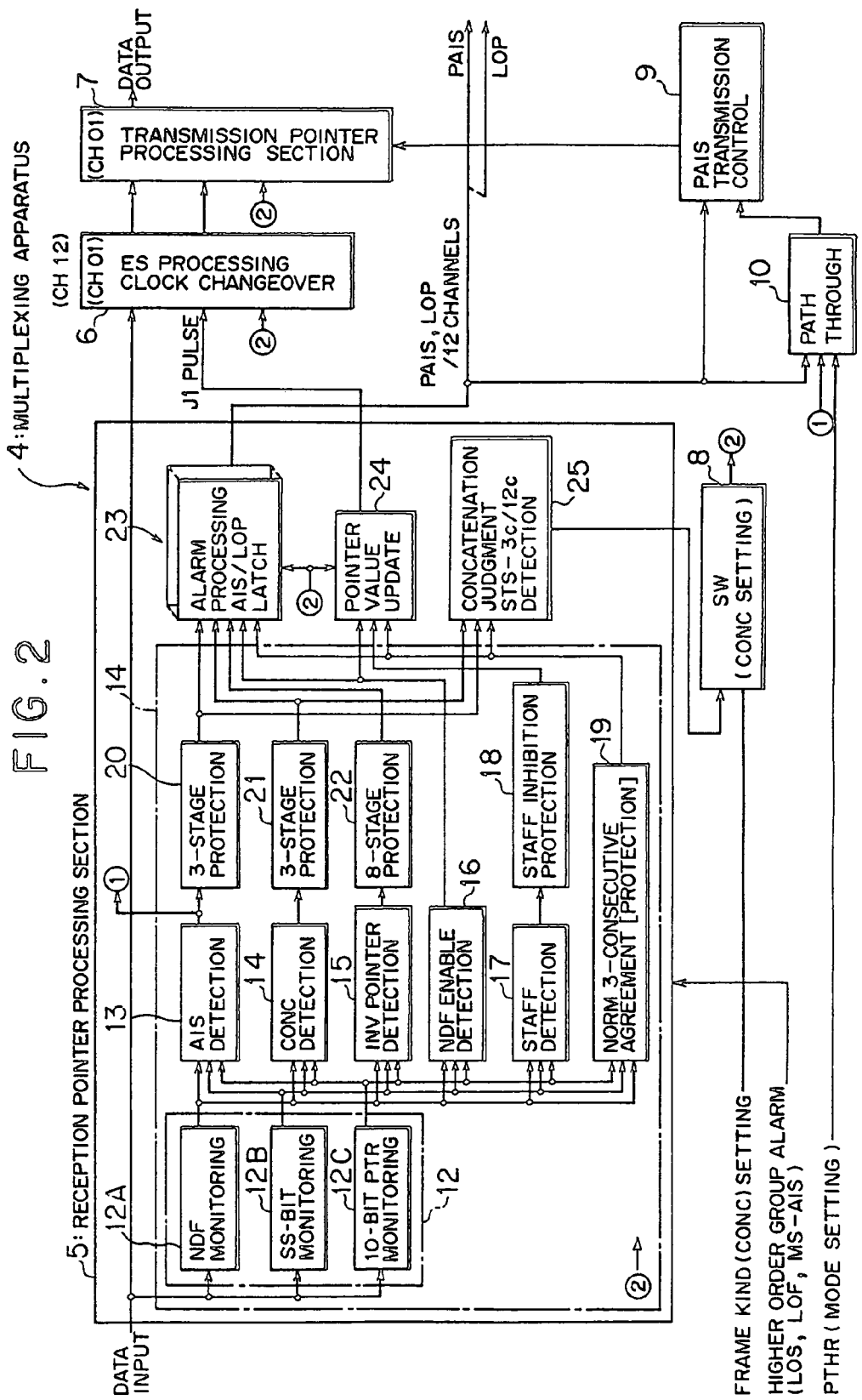
FIG. 2 is a schematic diagram of the composition of the essential parts of the multiplexing apparatus to which the reception pointer processing apparatus is applied as an embodiment of the present invention.
Figure 29:
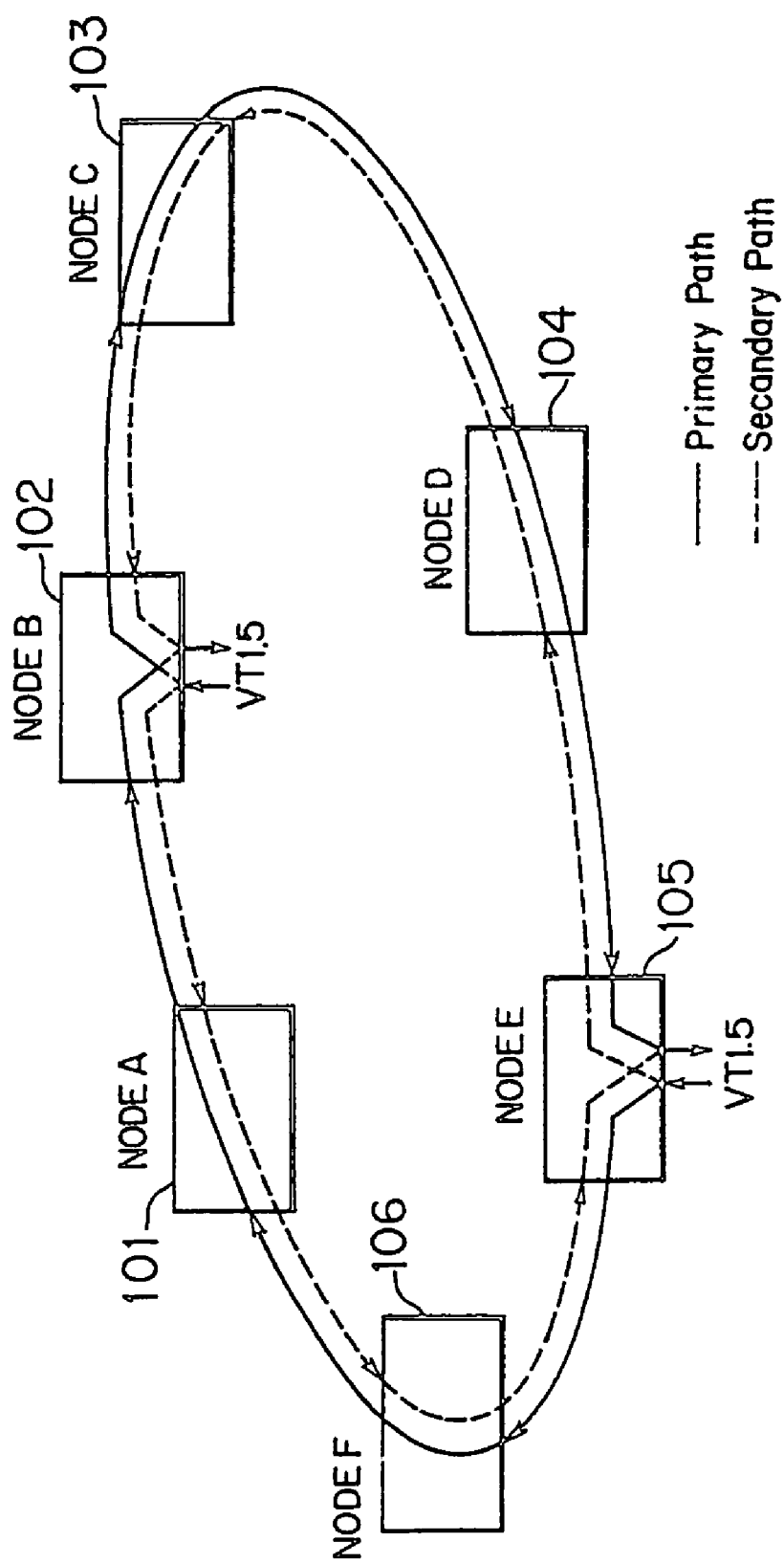
FIG. 29 is a diagram showing an example of a representative SONET (SDH) transmission network.
Figure 30:
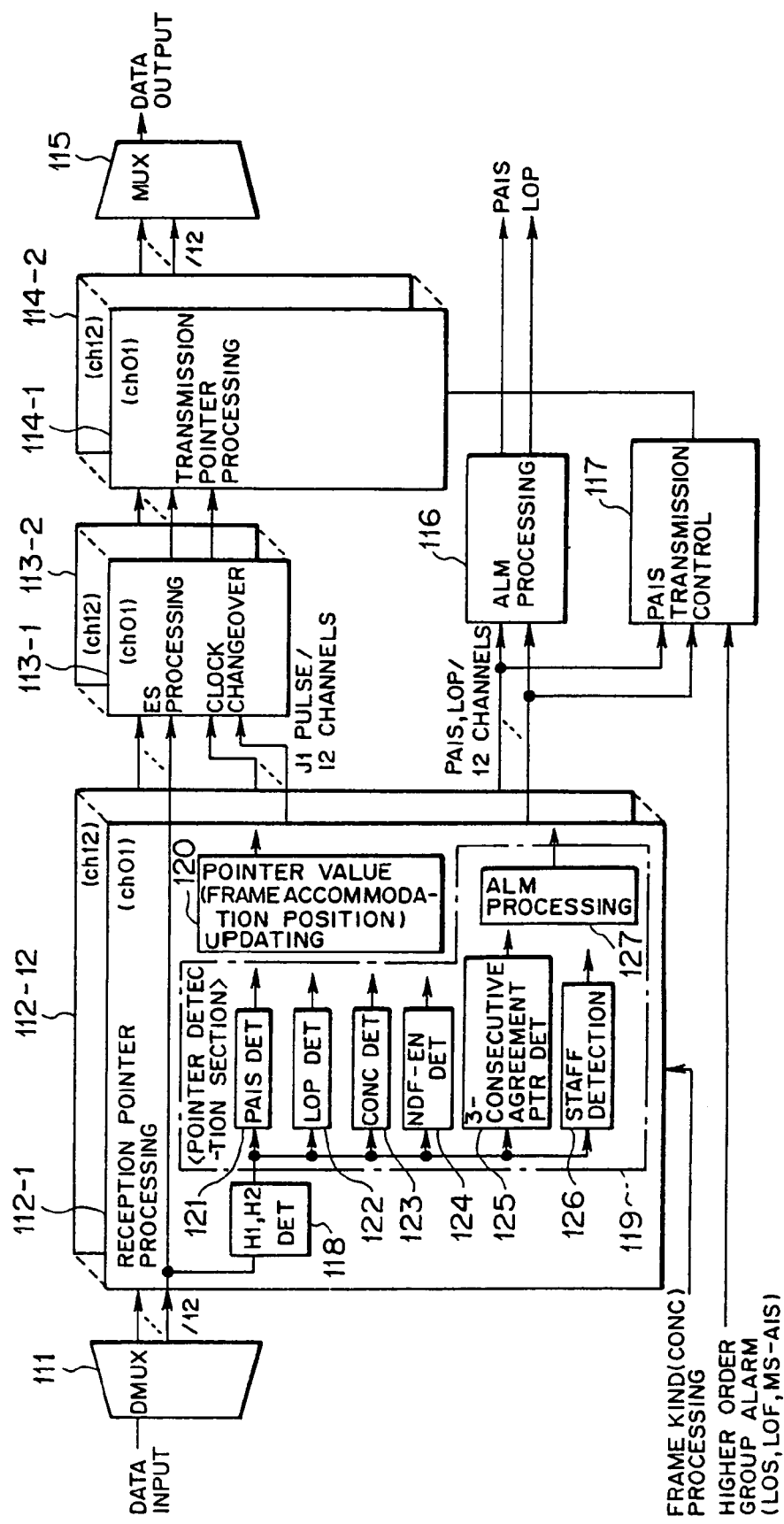
FIG. 30 is a block diagram showing a composition example of the essential parts of the multiplexing apparatus in respect of pointer processing function.
Figure 31:
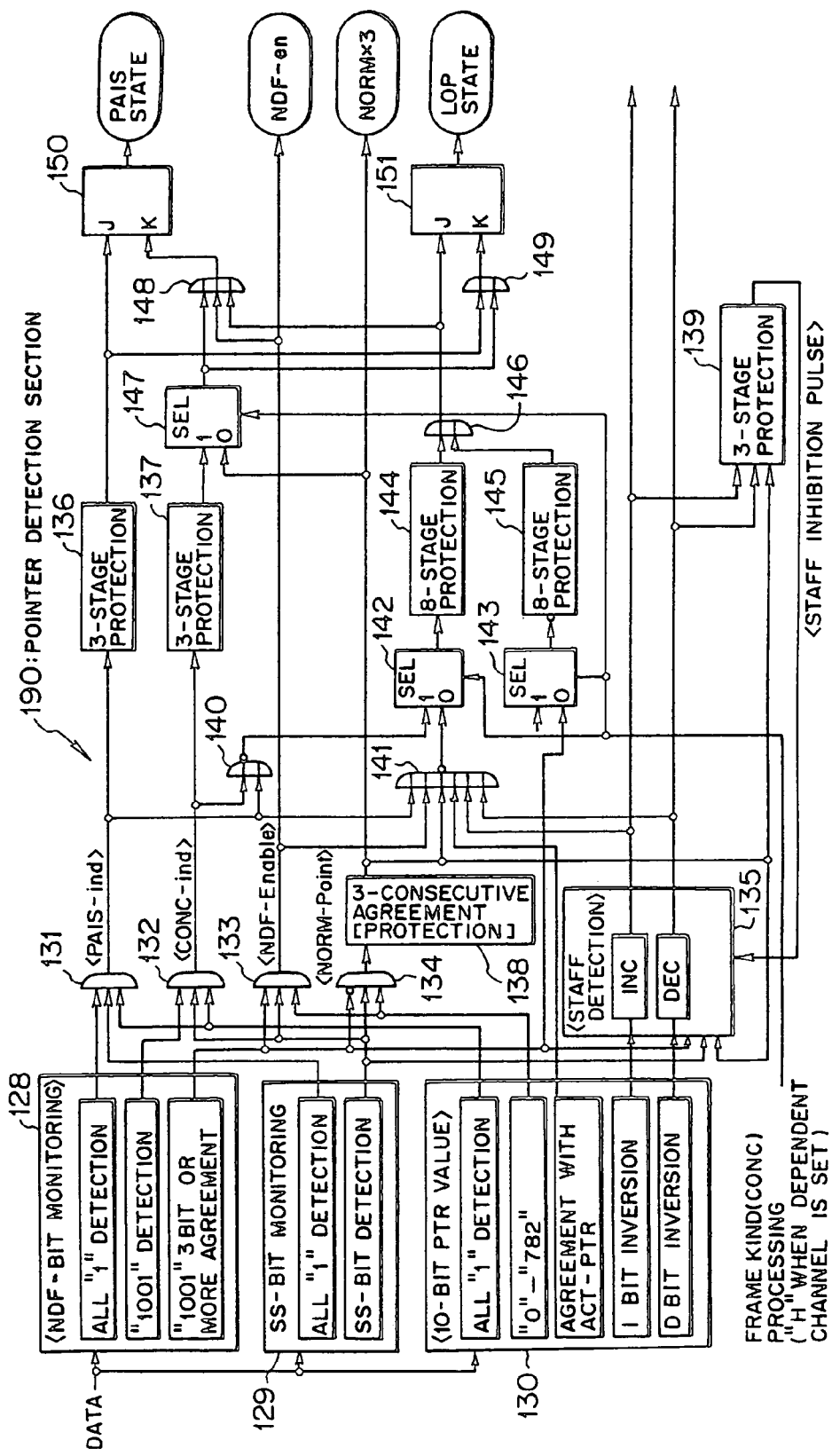
FIG. 31 is a block diagram showing an example of the essential parts of the pointer detection section.

FIG. 2 is a schematic diagram of the composition of the essential parts of the multiplexing apparatus to which the reception pointer processing apparatus is applied as an embodiment of the present invention. The multiplexing apparatus 4 shown in this FIG. 2 corresponds to the apparatus 10$i$ (i=1 to 6) mentioned before with reference to FIG. 29 and comprises in this embodiment, as shown in this FIG. 2, a reception pointer processing section (reception pointer processing apparatus) 5, a clock changeover section 6, a transmission pointer processing section 7, a concatenation (CONC) setting selector switch section 8, a PAIS transmission control section 9 and a path through control section 10.

Here, the reception pointer processing section 5 performs the reception pointer processing as described in the item (1) to (3) below to the received transmission frame (in this case, for instance, the STS-12 frame is inputted as 8 serial data (bit rate≈78 Mbps)) and, in this embodiment, either CONC setting identified automatically inside as mentioned below [frame size=frame composition of the received transmission frame (STS-1/3c/12c)] or the CONC setting fixedly set from outside (provisioning setting) is selected by the CONC setting selector switch section 8 for performing the reception pointer processing corresponding to such CONC setting.

(1) Automatic identification of the frame composition of the received transmission frame from pointer byte (H1 and H2 bytes; total 16 bits) contained in the received transmission frame.

(2) Detection of the NDF (New Data Flag) bit, the SS-bit and the 10-bit pointer value of the pointer byte.

(3) Alarm detection of the PAIS (Path Alarm Indication Signal), the LOP (Loss Of Pointer) or the like from the pointer byte.

On the other hand, the clock changeover section 6 changes over [changeover from transmission line (line) →system side clock] the main signal data after the reception pointer processing in this reception pointer processing section 5 and, in this embodiment, this clock changeover processing is performed serially by the transmission rate (bit rate) corresponding to the byte processing of the transmission frame.

Figure 3:
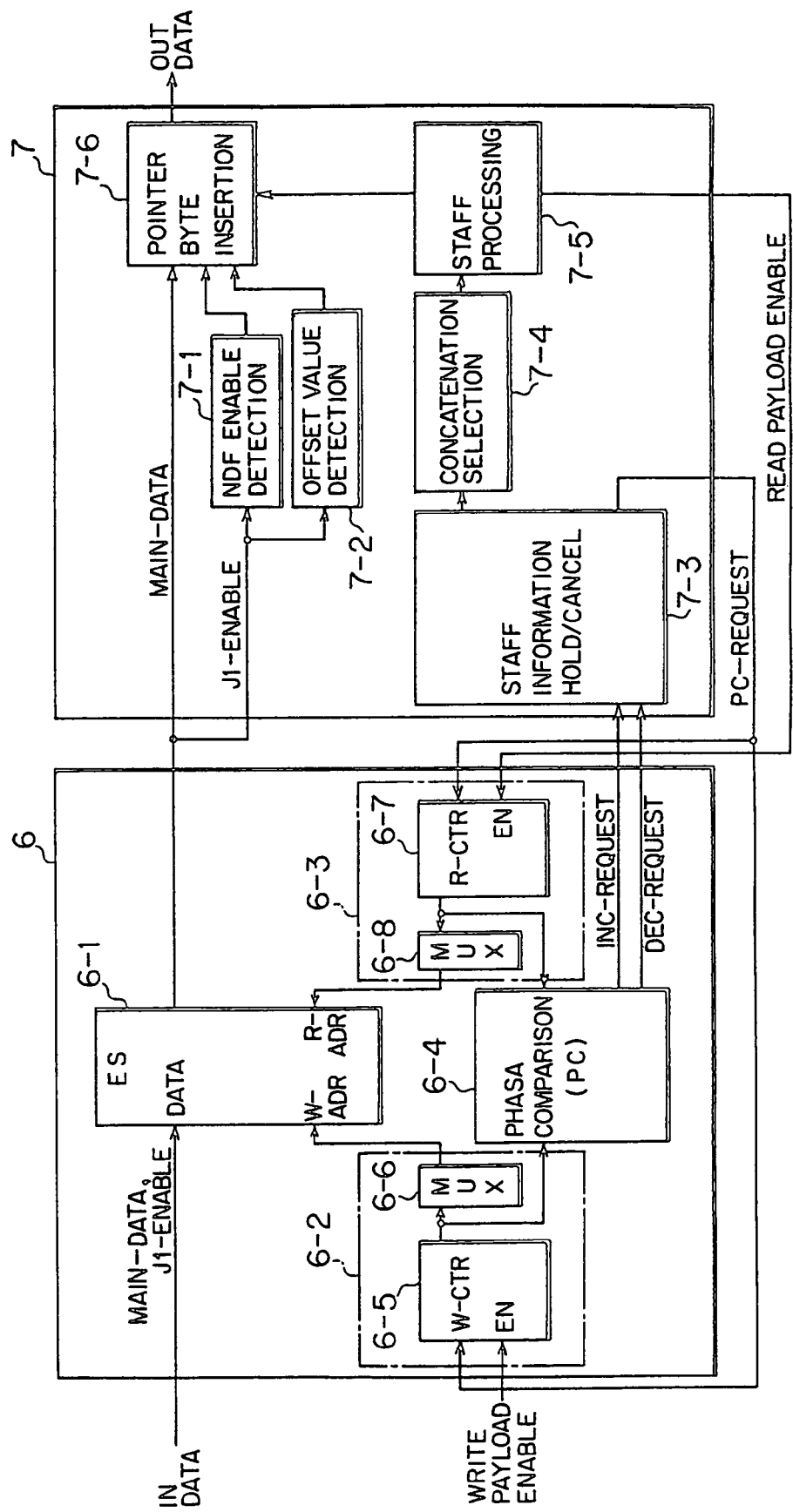
FIG. 3 is a block diagram showing the composition of a clock changeover section and a transmission pointer processing section according to this embodiment.
Figure 4:
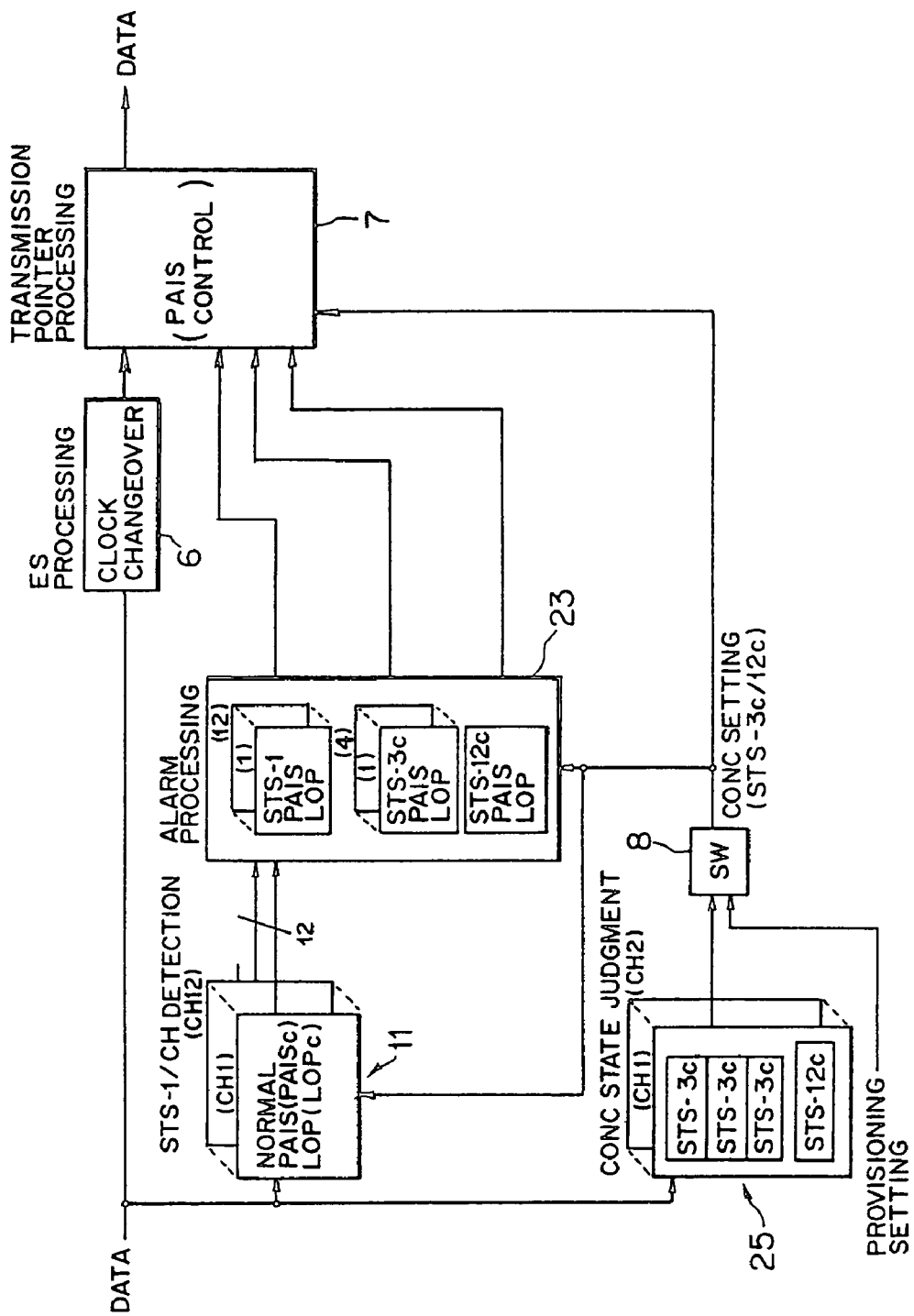
FIG. 4 is a diagram illustrating the outline of the operation of the reception pointer processing section according to this embodiment.

To be more specific, this clock changeover section 6 comprises, as shown in FIG. 3 for example, a memory section 6-1, a write control section 6-2, a read control section 6-3 and a phase comparison (PC) section 6-4.

Here, the memory (storing section) 6-1 stores the main signal data of the STS-12 frame after the reception pointer processing in a given address by the respective channel (ch01 to ch12) and, in this case, all 12 channels are divided into 4 channel group ① to ④ as shown below considering concatenation of the main signal data (STS-3c/12c), especially STS-3c, for storing channel data respectively in independent RAM by respective division groups ① to ④.

Channel group ①=ch01 to ch03
Channel group ②=ch04 to ch06
Channel group ③=ch07 to ch09
Channel group ④=ch10 to ch12

The write control section 6-2 controls the write address and the write timing to this memory section 6-1 while the read control section 6-3 controls the read address and the read timing to the memory section 6-1 and for this purpose, in this embodiment, the write control section 6-2 comprises a write counter section 6-5 and a multiplexing section 6-6 while the read control section 6-3 comprises a read counter section 6-7 and a multiplexing section 6-8.

Here, in the write control section 6-2, the write counter section 6-5 generates at serial timing write address for channel data composing the channel group ① to ④ by each channel group (division group) ① to ④ divided as mentioned before while the multiplexing section 6-6 time-divisionally multiplexes write address for respective channel data generated by this write counter section 6-5 for supplying to the write address input (corresponding RAM) of memory section 6-1.

On the other hand, in the read control section 6-3, the read counter section 6-7 generates at serial timing the read address for the channel data composing the channel group ① to ④ by the channel group ① to ④ divided as mentioned before while the multiplexing section 6-8 time-divisionally multiplexes the read address for respective channel data generated by this read counter section 6-7 for supplying to the read address input (corresponding RAM) of the memory section 6-1.

More particularly, the write/read address is generated respectively at the timing shifted by at least one channel data in the STS-12 frame so as to produce write/read address for respective channel data (RAM) at serial timing [ch1→ch4→ch7→ch10→ch2→ch5→ . . . →ch9→ch12].

The write/read counter section 6-5, 6-7 is respectively responsive to (write side) the payload enable detected at the reception pointer processing/to (read side) the payload enable detected at the transmission processing.

The phase comparison section 6-4 compares the write address generated by the write control section 6-2 and the read address generated by the read control section 6-7 for detecting the staff (INC/DEC) request signal or the PC reset signal for the transmission pointer processing section 7 based on the comparison result.

Now, in FIG. 2, the transmission pointer processing section 7 serially performs the NDF enable detection, the staff request detection, the transmission pointer value detection in respect of main signal data after the clock changeover processing in the clock changeover section 6 and, in this embodiment, as shown in FIG. 3, comprises an NDF enable detection section 7-1, an offset value detection section 7-2, a staff information hold/cancel section 7-3, a concatenation select section 7-4, a staff processing section 7-5 and a pointer byte insertion section 7-6.

Here, the NDF enable detection section 7-1 detects the J1 enable signal (main signal data leading position information) contained in the main signal data after the clock changeover read out from the memory section 6-1 of the clock changeover section 6 for generating the NDF enable signal based on this J1 enable signal while the offset value detection section (transmission pointer value detection section) 7-2 detects the transmission pointer value (offset pointer value) to be inserted into the main signal data based on the J1 enable signal.

Note that, in this embodiment, the NDF enable detection section 7-1 is composed to monitor the reception interval (detection interval) of the J1 enable signal and to mask the transmission of the NDF enable signal when this reception interval is not constant while the offset value detection section 7-2 is composed to detect serially the transmission pointer value.

The staff information hold/cancel section 7-3 holds the staff information (INC/DEC) detected by the phase comparison section 6-4 of the clock changeover section 6 or deletes (cancels) the unnecessary staff information while the concatenation select section 7-4 generates PC reset request signal for initializing (adjusting) the write/read access timing to the memory section 6-1 and, here, if the main signal data is the concatenation state such as the STS-3c/12c, it generates the PC reset request signal only for the write/read access timing for the leading channel data (ch01, ch04, ch07, ch10 in STS-3c and ch01 in STS-12c).

The staff processing section 7-5 performs the staff processing of the pointer byte to be inserted into the main signal considering the concatenation state (sometimes called simply "concatenation" hereinafter) based on the staff information (staff instruction signal received from the phase comparison section 6-4 according to the phase state of write/read access timing for the memory section 6-1 in the clock changeover section 6) held in the staff information hold/cancel section 7-3.

The pointer byte insertion section 7-6 inserts the pointer byte into the main signal read from the memory section 6-1 based on the processing results in the NDF enable detection section 7-1, the offset value detection section 7-2 and the staff processing section 7-5. Note that this pointer byte insertion section 7-6 performs the insertion processing by making the main signal all "1" upon the reception of the PAIS transmission control instruction and only pointer byte all "1" upon the reception of the path through function (function for the purpose of reducing transmission delay of PAIS between SDH transmission attaratuses) operation instruction by the path through control section 10.

In FIG. 2, the CONC setting selector switch 8 selects either CONC setting automatically identified and set by the reception pointer processing section 5 or the CONC setting fixedly set from outside while the PAIS transmission control section 9 controls the transmission pointer processing section 7, upon the detection of the PAIS indication or the LOP indication by the reception pointer processing section 5, to make the main signal data after the clock changeover all "1" for communicating such detection to downstream devices.

Moreover, the path through control section 10 gives the path through mode operation instruction to the PAIS transmission control section 9 when the path through mode is set and when the path through mode is set, as mentioned before, it makes only the pointer byte of the main signal after the clock changeover all "1" for outputting it outside immediately.

Now the outline of the operation of the multiplexing apparatus 4 of this embodiment composed as mentioned before will be described below. First, the reception pointer processing section 5 performs a reception pointer processing of received transmission frame (STS-12 frame) data according to the CONC setting automatically identified inside or the CONC setting fixedly set from outside.

The main signal data after the reception pointer processing is output to the clock changeover section 6 and in the clock changeover section 6 the write counter section 6-5 of the write control section 6-2 generates serially the write address for the memory section 6-1 for the each channel group ① to ④ according to the write side payload enable signal (line side operation clock).

Then respective write address is multiplexed by the multiplexing section 6-6 before directly delivered to the write address input of the memory section 6-1 and, by this, the input main signal data is sequentially stored in the memory 6-1 by each channel for each channel group ① to ④.

On the other hand, in the read control section 6-3, the read counter section 6-7 generates serially the read address for each channel group ① to ④ according to the read side payload enable signal (system side operation clock) and, same as the write side, respective read addresses are multiplexed by the multiplexing section 6-8 before directly given to the read address input of the memory section 6-1. Then, by this, the main signal data stored in the memory section 6-1 is read by each channel for each channel group ① to ④ according to the system side clock for performing line side→system side clock changeover processing.

In other words, the clock changeover section 6 may perform the clock changeover processing serially without separating the STS-12 main signal data by the STS-1.

Moreover, the phase comparison section 6-4 monitors at this time the write/read access timing to the memory section 6-1 by comparing the write/read address and transmits respectively the INC request signal upon detection of the INC state and the DEC request signal upon detection of the DEC state to the transmission pointer processing section 7. Here, the transmission pointer processing section 7 transmits the PC reset signal to respective write/read counter section 6-5, 6-7 upon the detection of the memory slip state from these INC/DEC request signals.

Then, in the transmission pointer processing section 7, according to the J1 enable signal contained in the main signal data after the clock changeover read out as mentioned above from the memory section 6-1, the NDF enable detection section 7-1 and the offset value detection section 7-2 detect respectively the NDF enable signal and the transmission pointer value for giving to the pointer byte insertion section 7-6. However, the NDF enable signal is not detected during the reception of the J1 enable signal at a constant interval.

The pointer byte insertion section 7-6 inserts the transmission pointer byte into the main signal based on these NDF enable signal, the transmission pointer value and the staff information (INC/DEC) from the staff processing section 7-5. However, the staff information is generated (detected) considering the concatenation state of the main signal data based on the staff request from the phase comparison section 6-4 of the clock changeover section 6.

Now the reception pointer processing section 5, the essential part of this embodiment, will be described more in detail.

As shown in FIG. 2, the reception pointer processing section 5, the essential part of this embodiment, comprises as the pointer processing section 11 for performing various pointer detection processing of the received transmission frame pointer byte, a pointer detection (monitoring) section 12, an AIS indication detection section 13, a concatenation (CONC) indication detection section 14, an invalid (INV) pointer detection section 15, an NDF enable detection section 16, a staff information detection section 17, a staff inhibition protection section 18, a normal pointer value 3-consecutive agreement detection section 19, 3-stage protection sections 20, 21 and 8-stage protection section 22 and is composed to comprise an alarm processing section 23, a pointer value updating section 24 and a concatenation (CONC) judgment section 25.

Here, the pointer detection section 11 detects (monitors) the NDF-bit, the SS-bit and the pointer value contained in the received transmission frame pointer byte and, in this embodiment, it is composed to comprise an NDF monitoring section 12A for monitoring the NDF-bit, an SS-bit monitoring section 12B for monitoring the SS-bit and a 10-bit pointer value monitoring section 12C for monitoring 10-bit pointer value. Note that, the SS-bit monitoring section 12B in this embodiment, as mentioned below, may change the SS-bit detection condition so as to deal with both of SDH/SONET.

On the other hand, the AIS indication detection section 13 detects the AIS state of the pointer byte based on respective monitoring results in the NDF monitoring section 12A, the SS-bit monitoring section 12B and the 10-bit pointer monitoring section 12C while the CONC indication detection section 14 detects, when respective monitoring results of the respective monitoring section 12A to 12C satisfy simultaneously respective conditions of the following items (1) to (3) as mentioned below, the concatenation indication (CI) indicating that the received transmission frame (STS-12 frame) are of concatenation state (STS-3c/12c frame) composed by linkage of a plurality of STS-1 frames (unit frame).

CI detection condition (1) No. 1 to No. 4 bit (NDF-bit) in a pointer byte (total 16 bits) agrees with "1001" for 3 bits or more (2) No. 5 and No. 6 bit (SS-bit) in a pointer byte is "00" or "Don't care"

(3) No. 7 to No. 16 bit (1-bit/D-bit/pointer value) in a pointer byte indicate all "1"

Figure 13:
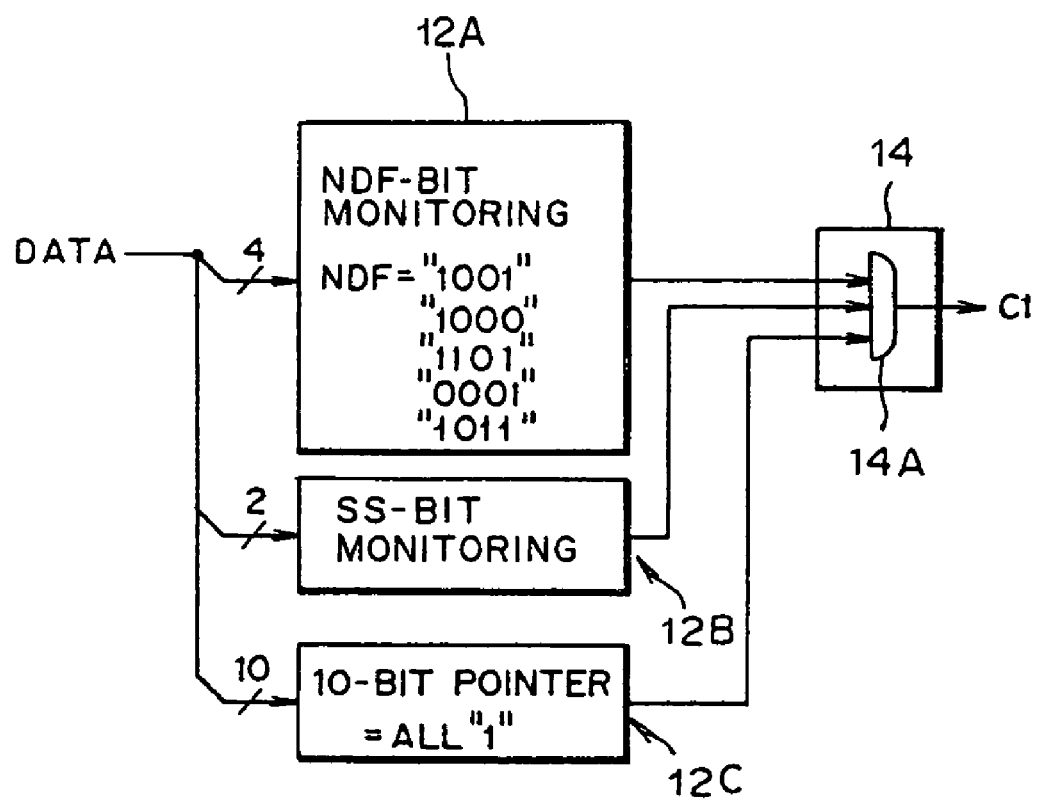
FIG. 13 is a diagram illustrating the detection condition at the CONC indication detection section according to this embodiment.

In other words, as shown in FIG. 13, in place of taking "1001" of the NDF-bit as the CONC indication detection condition, this CONC indication detection section 14 takes as the CONC indication detection condition the agreement with "1001" for 3 bits or more (there are 5 patterns: "1001", "1000", "1011", "0001") same as the NDF enable detection condition for preventing erroneous data reception due to the transmission line noise or the like during path kind (frame kind) transition through automatic identification of the CONC setting by the concatenation judgment section 25 and for ensuring a correct CONC indication detection all the time.

Moreover, the invalid pointer detection section 15 detects that the received pointer byte is the invalid pointer byte based on respective monitoring results of respective monitoring sections 12A to 12C and, in this case, as mentioned below, it changes the valid pointer byte detection condition according to the reception state and the frame composition of the transmission frame, for detecting as the invalid pointer byte those pointer bytes that do not meet such detection condition.

The NDF enable detection section 16 detects the NDF enable for switching the operation pointer value (active pointer value) immediately to a new pointer value in the reception pointer processing section 5 as soon as respective monitoring result of the respective monitoring sections 12A to 12C satisfy simultaneously the respective conditions shown in the following items (4) to (6) while the staff information detection section 17 detects the INC/DEC staff information based on respective monitoring result of the respective monitoring sections 12A to 12C for detecting the INC/DEC in response to the number of I-bit/D-bit inversion in the 10-bit pointer value.

NDF enable detection condition (4) No. 1 to No. 4 bit (NDF-bit) in a pointer byte agrees with "1001" for 3 bits or more (5) No. 5 and No. 6 bit (SS-bit) in a pointer byte is "Don't care" or "10" (corresponding to mode changeover mentioned below)

(6) No. 7 to No. 16 bit (pointer value) in a pointer byte indicate "000" to "782", range indicating normal path containing position.

Moreover, the staff inhibition protection section 18 delivers to the pointer value updating section 24 an inhibition signal for inhibiting the staff processing during 3 frames after the transmission of the staff information (INC/DEC) while the normal pointer value 3-consecutive agreement detection section 19 outputs the normal pointer indication 3-frame consecutive agreement detection signal when respective monitoring result of respective monitoring sections 12A to 12C satisfy simultaneously respective conditions shown in the following items (7) to (9) for 3 frames.

Normal pointer indication detection condition (7) No. 1 to No. 4 bit (NDF-bit) in a pointer byte is other than agreement with "1001" for 3 bits or more (8) No. 5 and No. 6 bit (SS-bit) in a pointer byte is "Don't care" or normal value (9) No. 7 to No. 16 bit (pointer value) in a pointer byte indicate "000" to "782", range indicating normal path containing position.

The 3-stage protection section 20 assures a 3-stage protection for the output from the AIS detection section 13 and, upon the detection of the PAIS indication for 3-consecutive frames by the AIS detection section 13, this detection (delivers "H" pulse) is informed to the alarm processing section 23 and the CONC judgment section 25. The 3-stage protection section 21 assures a 3-stage protection for the output from the CONC indication detection section 14 and, upon the detection of CONC indication for 3-consecutive frames by the CONC indication detection section 14, this detection is informed to the alarm processing section 23 and the CONC judgment section 25.

The 8-stage protection section 22 detects the LOP state by assuring a 8-stage protection for the output from the invalid pointer detection section 15 and, upon the detection of the invalid pointer for 8-consecutive frames by the invalid pointer detection section 15, supplies the alarm processing section 23 with the LOP state detection signal for making the alarm processing section 23 perform the PAIS state processing.

The alarm processing section 23 performs the alarm processing based on the pointer processing result (detection result) of the pointer processing section 11 and, for instance, upon the detection of the PAIS indication for 3-consecutive frame in the 3-stage protection section 20, outputs the PAIS state signal while, upon the detection of LOP indication for 8-consecutive frames in the 8-stage protection section 22, outputs the LOP state signal.

The pointer value updating section 24 updates the active pointer value upon the detection of the NDF enable by the NDF enable detection section 16.

Moreover, the concatenation judgment section (frame composition identification section) 25 monitors and identifies that the received transmission frame (STS-12) has which frame composition among STS-1/3c/12c based on the pointer processing results in the pointer processing section 11 and, in this embodiment, as mentioned below, the identification processing is performed based on respective detection result of the PAIS indication, the CONC indication and the normal pointer value 3-consecutive agreement.

In the reception pointer processing section 5 of this embodiment composed as mentioned above, the PAIS, the LOP, the CI, the INC/DEC detection is performed individually from the pointer byte for 12 channels of STS-12 frame received at the pointer processing section 11 according to the setting of the CONC setting selector switch 8 (automatic identification result by the concatenation judgment section 25 or provisioning setting).

The detected state of respective channel is delivered to the alarm processing section 23, the alarm processing section 23 performs the alarm generation processing according to the state of respective pointer (STS-1/STS-3c/STS-12c) (according to the setting by CONC setting selector switch 8).

At this time, the concatenation judgment section 25 detects the state of respective channel independently of the processing by the pointer processing section 11 for detecting the CONC (Concatenation) state of the reception data.

In other words, the pointer processing section 11 performs the pointer detection corresponding to the leading channel and the dependent channel individually for each channel by the CONC setting (setting of STS-1/3c/12c) while the concatenation judgment section 25 detects the normal pointer indication, the PAIS indication, the LOP indication and the CI respectively irrespective of this CONC setting and identifies the path kind of reception 12 channels.

Thus, as the reception pointer processing section 5 identifies automatically the frame composition (STS-1/3c/12c) of the received transmission frame (STS-12) and reflects the identification result thereof in the reception pointer processing, irrespective of the frame composition of the received transmission frame, it may always flexibly assure the most appropriate reception pointer processing according to such frame composition. AS the consequence, it may flexibly respond to the larger capacity (higher rate) of the transmission frame and may enormously contribute to the improvement of the generality of this apparatus 5, and at the same time, may improve the availability of the transmission frame (line).

By the way, the pointer (detection) processing and the concatenation judgment processing (identification processing) are, in this embodiment, not performed at the bit rate corresponding to the STS-1 level byte processing but at the rate based on the bit rate (about 622 Mbps) of the transmission frame (STS-12 frame); to be more specific, the time-divisional processing (serial processing) is performed at the bit rate (622 Mbps/8≈78 Mbps) corresponding to the byte processing of maximum frame apparatus (STS-12 level).

Figure 5:
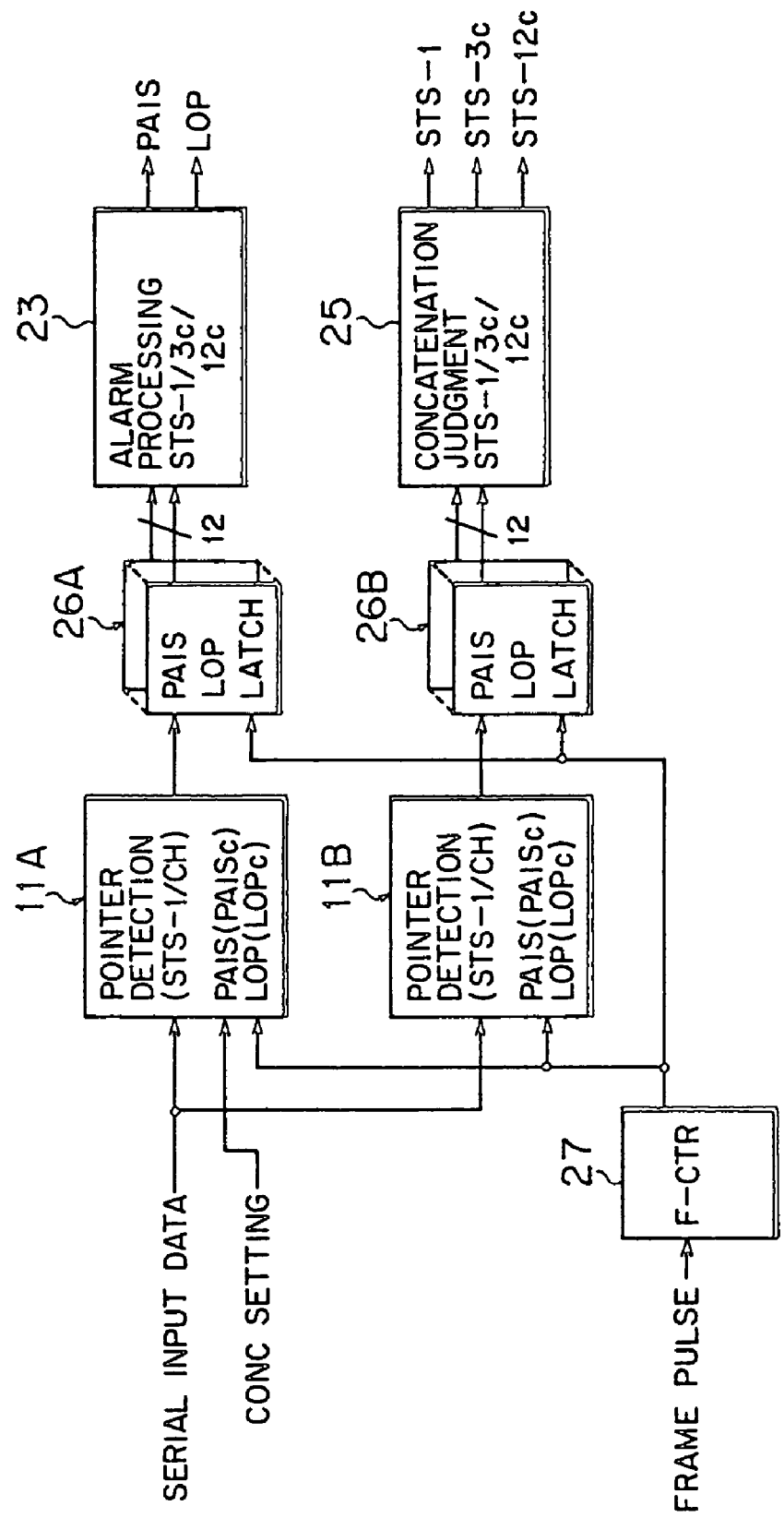
FIG. 5 is a diagram for explaining the concept of serial processing of the reception pointer processing section according to this embodiment.

FIG. 5 is a diagram for illustrating the concept of this serial processing. In this FIG. 5, the same symbol refers to the same element of FIG. 2 as described in FIG. 2; 11A is a pointer detection processing function section for performing the pointer detection processing (PAIS, LOP detection) for the alarm processing, 11B is a pointer detection processing function section for performing the pointer detection processing (PAIS, LOP detection) for the concatenation judgment processing, 26A and 26B are the latch section for latching the pointer detection processing results of corresponding pointer detection processing function sections 11A, 11B and 27 is a frame counter for controlling the operation of the pointer detection processing function sections 11A, 11B.

In FIG. 5, for the convenience of illustration, as the pointer detection processing function sections 11A, 11B, the pointer detection processing function is divided into the alarm processing system and the concatenation judgement processing system, however, in reality, it is considered that the pointer detection processing function section 11A corresponds to the part including the pointer detection section 12, the AIS indication detection section 13, the CONC indication detection section 14, the invalid pointer detection section 15 or others in FIG. 2, while the pointer detection processing function section 11B corresponds to the part including the pointer detection section 12, the AIS indication detection section 13, the CONC indication detection section 14, the normal pointer 3-consecutive agreement detection section 19 or others in FIG. 2 and respective detection sections 12 to 14 are made common to respective pointer detection processing function sections 11A, 11B.

By this composition, in this reception pointer processing section 5, the frame counter 27 operates (counts up) in response to the input frame pulse indicating the leading position of the input serial data (8 parallel) and generates channel timing pulse which is "H" for each STS-1 frame. Then, the pointer detection processing function section 11A, according to this channel timing pulse, executes serially the PAIS indication, the LOP indication detection processing by the STS-1 frame (channel) unit corresponding to the CONC setting from the CONC setting selector switch section 8.

Then the processing result for 12 channels (PAIS indication, LOP indication) in this pointer detection processing function section 11A is latched sequentially by the latch section 26A by channel unit according to the channel timing pulse. Latched PAIS indication, the LOP indication data is delivered to the alarm processing section 23 and the alarm processing section 23 performs alarm detection according to CONC setting (STS-12c/3c/1) based on this PAIS indication and this LOP indication data.

On the other hand, at this time, the pointer detection processing function section 11A also performs the PAIS indication, the LOP indication detection processing serially by the STS-1 frame unit according to the channel timing pulse from the frame counter 27, but this pointer detection processing function section 11A performs the pointer detection processing independently of the CONC setting.

Data detected in this pointer detection processing function section 11A is also latched sequentially by the latch section 26B by channel unit according to the channel timing pulse. The concatenation judgment section 25 judges serially the reception path state (frame composition) of the STS-12c/3c/1 based on data latched in this latch section 26B.

As mentioned before, the reception pointer processing section 5 performs the pointer detection processing and the concatenation judgment processing serially by the bit rate corresponding to the byte processing of the received transmission frame (STS12 frame) allowing to perform the pointer detection processing and the concatenation judgment processing rapidly without separating the received transmission frame by unit frame (STS-1) [without reducing input transmission frame bit rate (78 Mbps) to the bit rate (6 Mbps) corresponding to STS-1 frame byte processing]. As the consequence, the scale of this apparatus 5 can be reduced substantially and at the same time its power consumption may be reduced significantly.

Figure 6:
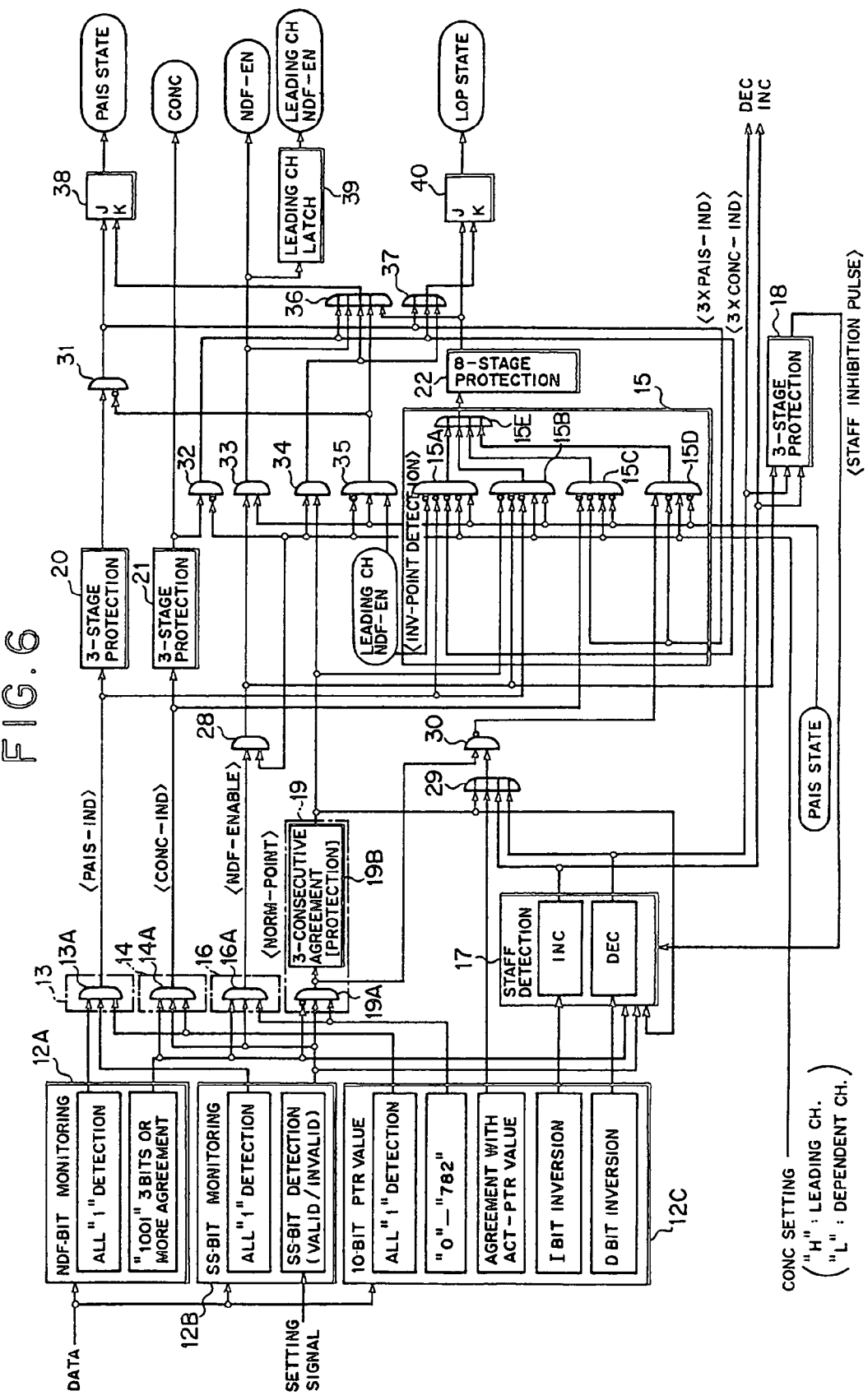
FIG. 6 is a block diagram showing the detailed composition of the reception pointer processing section according to this embodiment.

FIG. 6 is a block diagram showing the detailed composition of the pointer processing section 11. In this FIG. 6, the same symbol as FIG. 2 refers to the same element as described for FIG. 2 respectively; in this embodiment, as shown in FIG. 6, the PAIS indication detection section 13, the CONC indication detection section 14 and the NDF enable detection section 16 realize the detection function by using AND gates 13A, 14A and 16A taking respectively logical product of respective output of each monitoring sections 12A to 12C.

On the other hand, the invalid pointer detection section 15 realizes the invalid pointer detection function by using the AND gate 15A which is 4 inputs inverting among 5 inputs type, the AND gate 15B which is 3 inputs inverting among 5 inputs type, the AND gate 15C which is all inputs inverting type, the AND gate 15D which is 2 inputs inverting among 4 inputs type and 4-input OR gate 15E while the normal pointer 3-consecutive agreement detection section 19 realizes the normal pointer indication 3-frame consecutive agreement reception detection function by using the AND gate 19A which is 1 input inverting among 3 inputs type and 3-stage protection section 19B.

The respective protection section 18, 19B, 20 to 22 is realized using the RAM as mentioned below for smoothly performing respective serial processing.

Moreover, in this FIG. 6, 28, 33, 34 represent respectively 2-input AND gate, 29 4-input OR gate, 30 NAND gate, 31, 32 respectively AND gate which is 1 input inverting among 2 inputs type, 35 AND gate which is 1 input inverting among 3 inputs type, 36 5-input OR gate, 37 3-input OR gate, 38, 40 respectively JK-FF circuit and 39 leading channel latch section.

Here, the AND gate 13A composing the PAIS indication detection section 13 outputs the PAIS indication detection signal ("H" pulse) when the NDF-bit ALL "1" indication, the SS-bit ALL "1" indication and 10-bit pointer value ALL "1" indication are detected simultaneously by the monitoring section 12A to 12C respectively and the pointer byte ALL "1" is detected.

On the other hand, the AND gate 14A composing CONC indication detection section 14 outputs CONC indication (CI) detection signal ("H" pulse) when 3 bits or more agreement of "1001" of NDF-bit, SS-bit "00" indication [or invalid (no monitoring: "Don't care" by mode changeover mentioned below) and 10-bit pointer value ALL "1" indication are detected simultaneously by the monitoring section 12A to 12C respectively.

Moreover, the AND gate 16A composing the NDF enable detection section 16 outputs the NDF enable detection signal ("H" pulse) when 3 bits or more agreement of "1001" of the NDF-bit, the SS-bit "00" indication (or "Don't care" by mode changeover) and 10-bit pointer value normal value range ("000" to "782") indication are detected simultaneously by the monitoring section 12A to 12C respectively.

The output (NDF enable detection signal) of this AND gate 16A takes logical product CONC setting signal ("H" for processing leading channel, "L" for processing dependent channel) at the AND gate 28 for making NDF enable detection signal valid only when the leading channel is processed. However, the leading channel is ch01 to ch12 in STS-1, ch01 to ch04, ch07, ch10 in STS-3c and ch01 in STS-12c.

In the normal pointer 3-consecutive agreement detection section 19, the AND gate 19A outputs the normal pointer indication detection signal ("H" pulse) when the NDF-bit is the state except 3 bits or more agreement of "1001", the SS-bit normal value ("10" or "00") indication (or "Don't care" by mode changeover) and 10-bit pointer value the normal value range ("000" to "782") indication are detected simultaneously by the monitoring section 12A to 12C respectively and the 3-stage protection section 19B outputs the normal pointer 3-consecutive agreement detection signal upon 3-consecutive reception of the normal pointer indication detection signal ("H" pulse) from this AND gate 19A.

Note that the output of this 3-stage protection section 19B (normal pointer 3-consecutive agreement detection signal) is taken a logical sum with the active pointer value agreement detection signal (detected by 10-bit pointer value monitoring section 12C) and the staff information (INC/DEC) by the OR gate 29 and becomes active only when normal pointer indication detection signal, active pointer value agreement detection signal and the staff information (INC/DEC) are determined all "L" by NAND gate 30.

In the invalid pointer detection section 15, the AND gate 15A detects the state wherein the pointer byte for the dependent channel in PAIS state is neither of the NDF enable indication, the PAIS indication nor the CONC indication (state wherein such pointer byte should be made invalid) by taking logical sum of respective signal shown in the following items (1) to (5).

(1) Inverted signal of the NDF enable detection signal (latched by the leading channel latch section 39) for the leading channel (2) Inverted signal of the PAIS indication detection signal (3) Inverted signal of the CONC setting signal (4) Inverted signal of the 3-consecutive CONC indication detection signal (3×CONC−ind)

(5) PAIS state signal

On the other hand, the AND gate 15B detects the state wherein the pointer byte for the leading channel in the PAIS state is neither of normal pointer indication, the NDF enable indication nor the PAIS indication (state wherein such pointer byte should be made invalid) by taking logical sum of respective signal shown in the following items (6) to (10).

(6) Inverted signal of normal pointer 3-consecutive agreement detection signal (7) Inverted signal of NDF enable detection signal (output of AND gate 28)

(8) Inverted signal of PAIS indication detection signal (9) CONC setting signal

(10) PAIS state signal

Moreover, the AND gate 15C detects the state wherein the pointer byte for the dependent channel in non-PAIS state (normal state) is neither the PAIS indication nor the CONC indication (state wherein such pointer byte should be made invalid) by taking logical sum of respective signal shown in the following items (11) to (14).

(11) Inverted signal of CONC indication detection signal

(12) 3-consecutive PAIS indication detection signal (3×PAIS−ind)

(13) Inverted signal of CONC setting signal

(14) Inverted signal of PAIS state signal

The AND gate 15D detects the state wherein the pointer byte for the leading channel in non-PAIS state (normal state) is neither normal pointer indication, the staff (INC/DEC) indication nor PAIS indication (state wherein such pointer byte should be made invalid) by taking logical sum of respective signal shown in the following items (15) to (18).

(15) Normal pointer indication signal, staff indication signal (output of NAND gate 30)

(16) 3-consecutive PAIS indication detection signal (3×PAIS−ind)

(17) CONC setting signal

(18) Inverted signal of PAIS state signal

Additionally, the OR gate 15E generates the invalid pointer detection signal indicating that the received pointer byte is invalid, by taking logical sum of respective output of the AND gate 15A to 15D.

By this composition, this invalid pointer detection section 15 changes over the identification condition according to the frame state (normal/PAIS/CONC) for the detection (identification) of the invalid pointer indicating invalid pointer indication on a pointer byte and detects as the invalid pointer such pointer indication other than valid pointer in respective frame state as shown in the following items (19) to (21).

(19) In PAIS state . . . reception pointer byte is other than ALL "1"

(20) In normal state . . . reception pointer byte corresponding to the leading channel of CONC setting is other than normal pointer indication/NDF enable indication/staff indication indicating pointer value continuation/updating/changing (±1)

Figure 7:
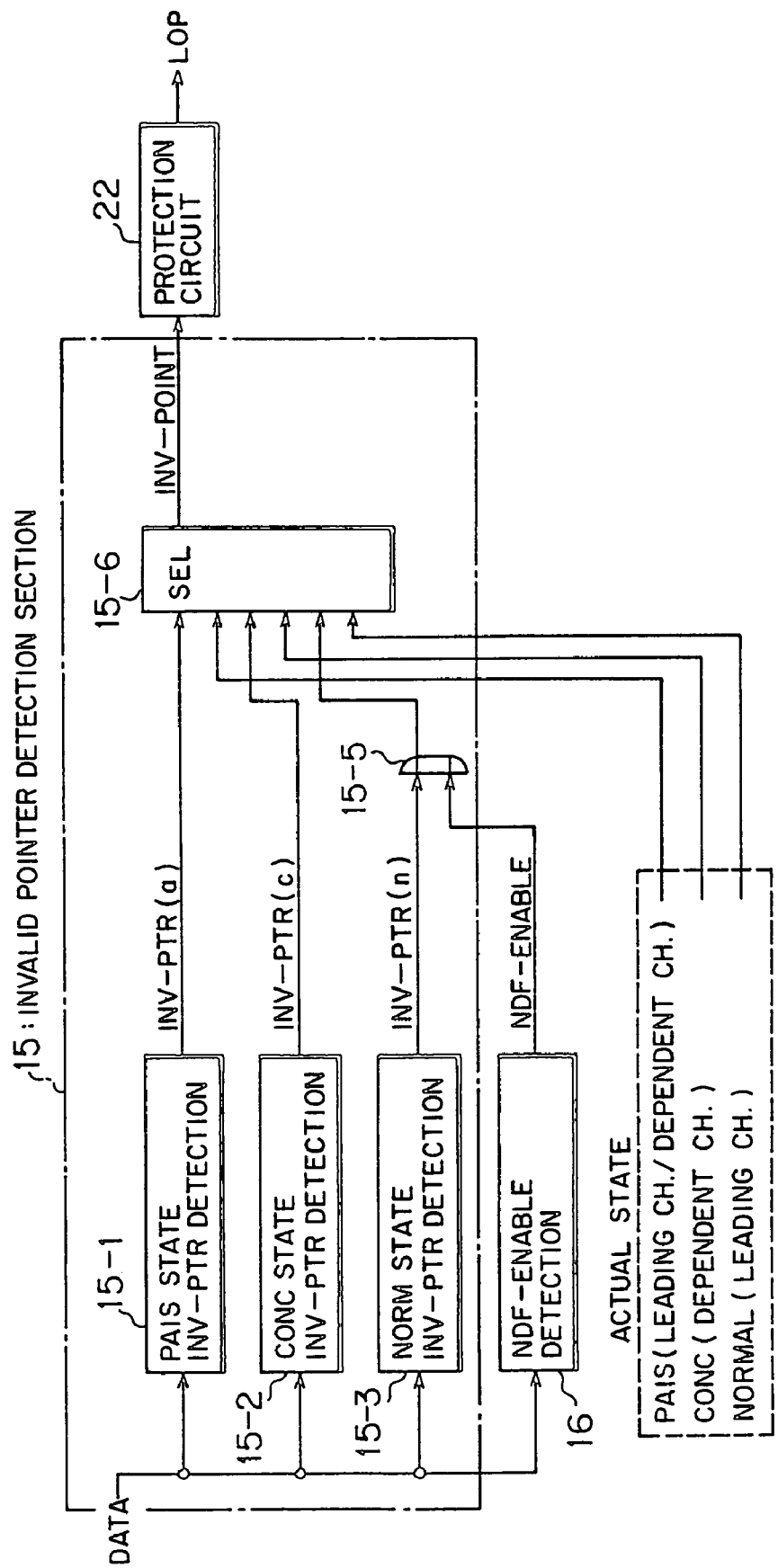
FIG. 7 is a block diagram showing the detailed composition of an invalid pointer detection section according to this embodiment.

(21) In normal state . . . reception pointer byte corresponding to the dependent channel of the CONC setting is other than the CONC indication In other words, this invalid pointer detection section 15 comprises, as shown in FIG. 7 for example, respective invalid pointer detection function section 15-1 to 15-3 in the PAIS state, in the CONC state and in normal (NORM) state so as to detect invalid pointer according to respective actual state by changing its output (detection condition) by the selector (SEL) 15-6 in response to respective actual state of the PAIS state (leading/dependent channel), the CONC state (dependent channel) and the NORM state (leading channel). Note that, in this FIG. 7, symbol 15-5 indicates the OR gate.

The invalid pointer detection section 15 shown in this FIG. 7 operates as follows. A detection function section 15-1 detects reception of other than the PAIS indication which is the invalid pointer identification condition in the PAIS state, a detection function section 15-2 detects reception of other than the CONC indication which is the invalid pointer identification condition of the STS-1 frame (channel data) corresponding to the dependent channel in the CONC concatenation setting and a detection function section 15-3 detects other than normal pointer, the NDF enable, the INC/DEC state indication which is the invalid pointer identification condition in normal state.

The invalid pointer information detected by respective detection function section 15-1 to 15-3 is selected and output according to the reception frame state (NORM, PAIS) by a selector 15-6 for detecting the invalid pointer indication reception corresponding to the frame state (actual state). Note that the detection of this invalid pointer indication reception for 8-consecutive frames makes the output from the 3-stage protection section 22 LOP transition condition.

In this invalid pointer detection section 15, at the normal state if 3 bits or more agreement (NDF enable detection condition) with the NDF-bit "1001" in a pointer byte corresponding to the leading channel of the CONC setting is received for 8-consecutive frames, as it constitutes also invalid pointer detection condition, logical sum of output of the detection function section 15-3 and output of the NDF enable detection section 16 is taken by the OR gate 15-5.

By this composition, the invalid pointer detection section 15 detects the invalid pointer under the appropriate condition according to the PAIS state, the CONC setting (frame composition) of the received transmission frame by detecting the invalid pointer byte by changing over the pointer state (detection condition) to be validated in response to the reception frame state (NORM, PAIS), the CONC setting (frame composition) in a way to, consequently, assure always a correct invalid pointer detection and contribute enormously to the improvement of the reliability of this apparatus 5.

Moreover, in FIG. 6, the AND gate 32 validates the output of the 3-stage protection section 21 (becoming "H" when the CONC indication detection signal succeeds for 3 frames) only in the dependent channel processing by the CONC setting signal while the AND gate 33 makes output of the AND gate 28 (becoming "H" when NDF enable detection signal for the leading channel is "H") valid only in the PAIS state.

The AND gate 34 validates normal pointer 3-consecutive agreement detection signal only in the leading channel processing by the CONC setting signal while the AND gate 35 validates the NDF enable detection signal for the leading channel latched by a leading channel latch section 39 only in the PAIS state and in the dependent channel processing by the CONC setting signal and the PAIS state signal.

The AND gate 31 validates 3-consecutive PAIS indication detection signal by taking logical product of output from the 3-stage protection section 20 for the PAIS indication detection and inverted output of this AND gate 35 while the OR gate 36 generates "H" pulse when any of following 5 signals becomes valid by taking logical sum of respective outputs of the respective AND gates 32 to 35 and 8-stage protection section 22 and the output thereof is connected to K input of the JK-FF circuit 38.

CONC indication detection signal

NDF enable detection signal for the leading channel

Normal pointer 3-consecutive agreement detection signal

NDF enable detection signal for the previous leading channel

LOP detection signal

OR gate 37 generates "H" pulse when any of 3 kinds of signal indicated below becomes valid by taking logical sum of respective outputs of the AND gates 31, 32, 34 and the output thereof is connected to K input of the JK-FF circuit 40.

(3-consecutive) PAIS indication detection signal

CONC indication detection signal

Normal pointer 3-consecutive agreement detection signal

Moreover, the JK-FF circuit 38 holds such PAIS indication detection signal through its J input when (3-consecutive) PAIS indication detection signal is detected through PAIS indication detection section 13 (AND gate 13A), 3-stage protection section 20 and the AND gate 31 and outputs as the PAIS state signal the held information (PAIS indication detection signal) when its K input becomes "H" (output of the OR gate 36 is "H").

A leading channel latch section 39 latches the NDF enable detection signal for the leading channel detected through the NDF enable detection section 16 (AND gate 16A), the AND gate 28 and the AND gate 33 and supplies the latched information (signal) to one input of the AND gate 15A of the invalid pointer detection section 15.

Moreover, the JK-FF circuit 40 holds such LOP detection signal through its J input when the LOP detection signal is detected through the invalid pointer detection section 15 and 8-stage protection section 22 and outputs as the LOP state signal the held information (LOP detection signal) when K input becomes "H" (output from the OR gate 37 is "H").

In the pointer processing section 11 composed as mentioned above, various pointer detection processing (PAIS indication, CONC indication, NDF enable, normal pointer indication, staff indication and others) for received transmission frame (STS-12 frame) is performed serially without separating the STS-12 data input by 8 serial data into respective channel (STS-1 frame: 96 parallel data).

For this purpose, the respective protection section 19B, 20 to 22 employs RAM for storing respectively normal pointer indication detection signal, the PAIS indication detection signal, the CONC indication detection signal, the invalid pointer detection signal, the staff information by each channel. Now the composition of these respective protection section 19B, 20 to 22 will be described in detail.

Figures 8, 9A, 9B:
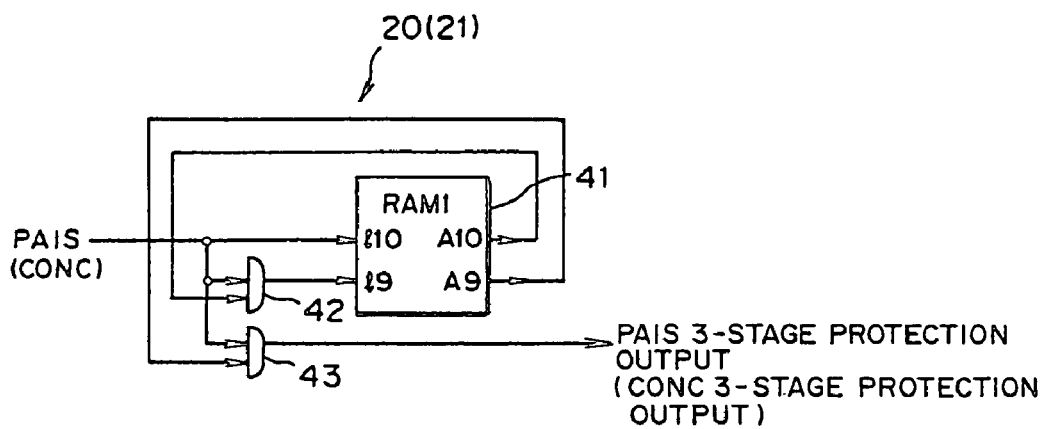
FIG. 8 is a block diagram showing the detailed composition of a 3-stage protection section for PAIS indication detection and a 3-stage protection section for CONC indication detection according to this embodiment.

FIG. 8 is a block diagram showing the detailed composition of the 3-stage protection section 20 for the PAIS indication detection and the 3-stage protection section 21 for the CONC indication detection. According to this embodiment, as shown in this FIG. 8, 3-stage protection sections 20, 21 are composed of the RAM 41 (RAM1), the AND gate 42, 43 respectively.

Here, the employed RAM 41 is of 11-bit composition as shown for example in FIG. 9(a) so as to contain (hold) the PAIS indication detection signal in the bit No. "10", "09", the CONC indication detection signal in the bit No. "08", "07", normal pointer 3-consecutive agreement detection signal in the bit No. "06", "05", the LOP detection signal in the bit No. "04" to "02" and staff inhibition signal in the bit No. "01", "00" respectively. Namely, changing the setting of bit number to be used, the only one RAM 41 can deal with all of the 5 types of signal (information). However, respective signal is sequentially held in different address area by each STS-1 frame (channel) respectively.

The AND gate 42 takes logical product of PAIS (CONC) indication detection signal (protection information) of the actual frame detected by the PAIS indication detection section 13 (CONC indication detection section 14) and the PAIS (CONC) indication detection signal of the previous frame held in the bit No. "10" of RAM 41 and, its output is held by the bit No. "09" of RAM 41 as information (a signal) indicating that the PAIS (CONC) indication detection signal is received for 2-consecutive frame when both signals coincide.

The AND gate 43 takes logical product of the PAIS indication detection signal of the actual frame and the signal held in the bit No. "09" of RAM 41 and outputs 3-consecutive PAIS (CONC) indication detection signal when the PAIS (CONC) indication detection signal is received for 3-consecutive frame by coincidence of both signals.

The output of the RAM 41 is output as the PAIS protection information of the previous frame at the same timing of the PAIS indication detection signal to be input into the protection section 20 (21) and input to the RAM 41 is made after the output.

The operation of the 3-stage protection section 20 (21) composed as mentioned before is as follows. Note that in the following, the description concerns the PAIS indication 3-stage protection.

In the initial state, the RAM 1 is in all "0" state; upon reception of the PAIS indication detection signal, "1" is written in the bit No. "10" (I10) of the RAM 41 while, upon reception of 2-consecutive frame of the PAIS indication detection signal, "1" by logical product by the AND gate 42 of output of the bit No. "10" (A10) of the RAM 41 and the reception PAIS indication detection signal is written in the bit No. "09" (19) of RAM 41.

Upon reception of 3-consecutive frame, a logical product of the actual frame PAIS indication detection signal and output of the bit No. "09" (A9) of the RAM 41 indicating reception state up to the previous frame is taken in AND gate 43 and, if both signals agree ("H"), "H" pulse is output as 3-stage protection output.

In other words, the 3-stage protection section 20 (21) performs in common to respective channel and serially 3-frame consecutive reception detection of the PAIS (CONC) indication detection signal by reading out the previous frame PAIS (CONC) indication detection signal from the RAM 41, for each channel, and by comparing the read out signal with the actual frame PAIS (CONC) indication detection signal.

Figure 32:
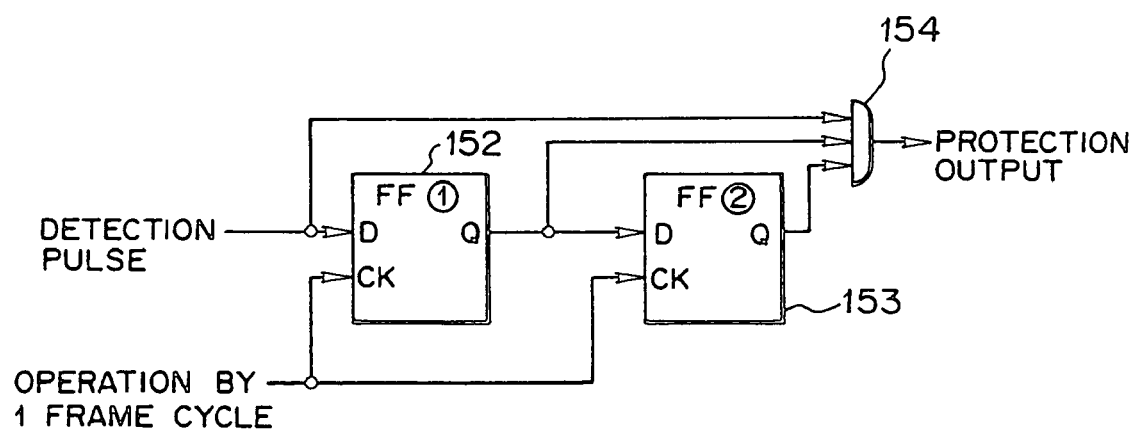
FIG. 32 is a block diagram showing an example of the 3-stage protection section.

As the consequence, it is unnecessary to provide circuit as shown in FIG. 32 for 12 channels and to provide the FF circuit corresponding to the number of protection stage, the composition thereof being as much simplified so as to contribute significantly to the substantial reduction in scale and power consumption of this apparatus 5. The serial processing can be performed at a high bit rate (78 Mbps) corresponding to the STS-12 data byte processing so as to contribute significantly to the substantial improvement of processing capacity of this apparatus 5.

Now, FIG. 10 is a block diagram showing the detailed composition of the 3-stage protection section 19B for normal pointer 3-consecutive agreement detection. According to this embodiment, as shown in this FIG. 10, the 3-stage protection section 19B comprises RAM 41, RAM 44 (RAM 2), the comparison section 45, the AND gate 46, 47.

Here, the RAM 41 is same as mentioned before for FIG. 8 and FIG. 9(a); however, the bit number to be used is set to "06", "05" because the protection information to be held is normal pointer indication. The RAM 42 holds received 10-bit pointer value and, for this purpose, 10-bit composition as shown in FIG. 9(b) for example is employed. This RAM 42 also, holds sequentially pointer values in different address area by each STS-1 frame (channel).

The comparison section 45 compares the actual frame reception 10-bit pointer value (A) and the previous frame reception 10-bit pointer value (B) held in the RAM 44 and supplies the AND gate 46 with "H" pulse upon the agreement of both pointer values (A=B).

On the other hand, the AND gate 46 compares the normal pointer indication detection signal detected by the AND gate 19A (refer to FIG. 6) and information held in the bit No. "05" of the RAM 41 (previous frame normal pointer indication detection signal) and, when both signals agree (become "H") and upon the reception of signal ("H" pulse) indicating the agreement of the actual and the previous frame reception 10-bit pointer values from the comparison section 45, it writes 2-stage protection information indicating the detection of 2-frame consecutive normal pointer indication into the bit No. "06" of RAM 41.

The AND gate 47 takes logical product of output information from this AND gate 46 and information (2-stage protection information) held in the bit No. "06" of the RAM 41 and it is output as normal pointer value 3-consecutive agreement detection signal.

By the composition mentioned above, this 3-stage protection section 19B holds the reception pointer value and compares with the next frame reception pointer value by the RAM 44 and the comparison section 45 and, during the agreement of both pointer values, reads out the previous frame normal pointer indication detection signal from the RAM 41 for comparing with the actual frame normal pointer indication detection signal, for each channel, in a way same as the 3-stage protection section 20 (21), by the RAM 41, the AND gate 46, 47 in order to detect normal pointer 3-consecutive agreement serially in common to respective channel.

Consequently, in this case also, it contributes significantly to the substantial reduction in scale and power consumption of this apparatus 5 and, at the same time, it contributes significantly to the substantial improvement of processing capacity of this apparatus 5.

Figure 11:
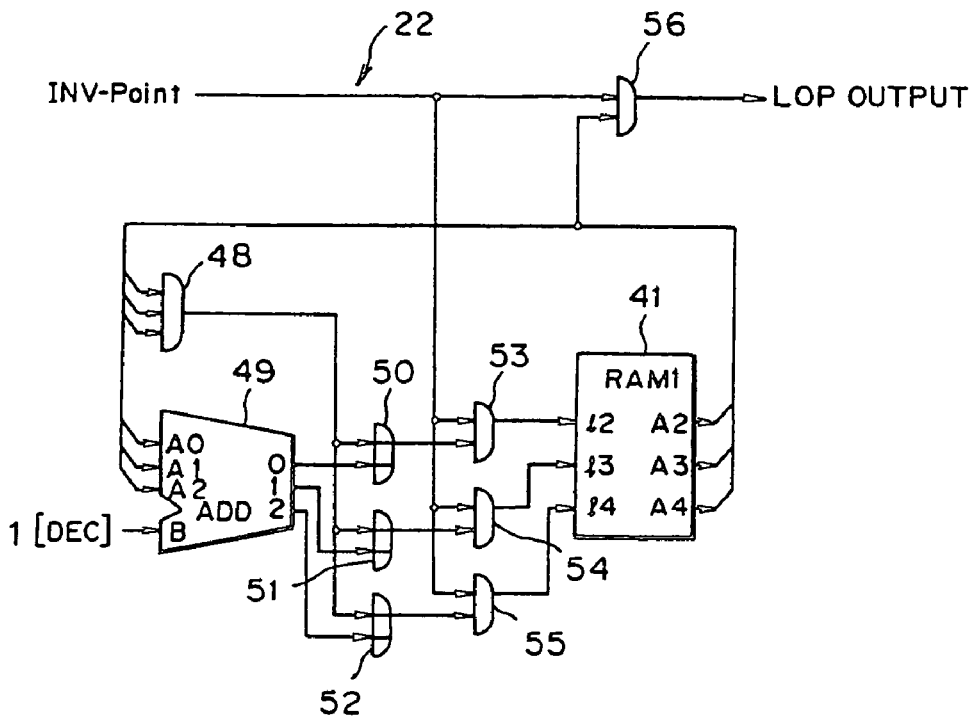
FIG. 11 is a block diagram showing the detailed composition of a 8-stage protection section for LOP detection according to this embodiment.

Next, FIG. 11 is a block diagram showing the detailed composition of the 8-stage protection section 22 for the LOP detection. As shown in this FIG. 11, the 8-stage protection section 22 of this embodiment comprises the RAM 41, the AND gate 48, 53 to 55, the adder (3-bit adder) 49, the OR gate 50 to 52.

Here, the RAM 41 is same as mentioned before for FIG. 8 and FIG. 9(a), but bit number to be employed for the LOP detection is set to "04" to "02". The AND gate 48 takes logical product of 3-bit protection stage number information held respectively in the bit No. "04" to "02" of the RAM 41 and outputs "H" pulse to respective OR gate 50 to 52 when the 3 bits becomes ALL "1" so as to maintain this state (ALL "1").

Moreover, the adder 49 adds "1" to the 3-bit protection stage number information while the OR gate 50 to 52 takes logical sum of output from this adder 49 and output from the AND gate 48 respectively so as to count sequentially "000" to "111" value for each output of 3 bits until the 3 bits becomes ALL "1".

The AND gates 53 to 55 takes logical product of the actual frame invalid pointer detection signal (INV-Point) and output of corresponding OR gates 50 to 55 and each time the invalid pointer detection signal is received successively, respective output is validated so as to write the output (count value) from respective OR gate 50 to 52 into the bit No. "04" to "02" of RAM 41.

The AND gate 56 validates received invalid pointer detection signal when 3-bit output from the RAM 41 becomes ALL "1" and delivers as the LOP detection signal.

By this composition, in this 8-stage protection section 22, each time the invalid pointer detection signal is received successively, 3-bit value to be written into the RAM 41 by the adder 49 is count up from the initial value "000" sequentially. Upon the reception of 7-frame consecutive invalid pointer detection signal, 3-bit output from the RAM 41 becomes ALL "1" to enable the output from the AND gate 56.

In this state, if the invalid pointer detection signal is received again in the next frame and, in total, if 8-frame consecutive invalid pointer detection signal is received, the AND gate 56 outputs the LOP detection signal (8-stage protection result). Note that this processing is also performed serially in common to all channels.

Consequently, in this case also, it contributes significantly to the substantial reduction in scale and power consumption of this apparatus 5 and, it contributes significantly to the substantial improvement of processing capacity of this apparatus 5.

Figure 12:
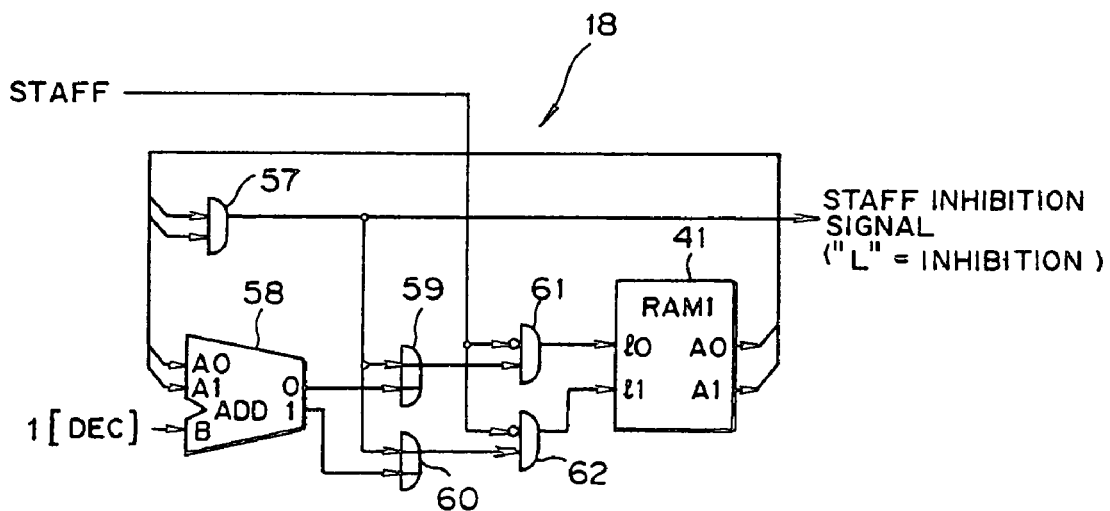
FIG. 12 is a block diagram showing the detailed composition of a staff inhibition protection section according to this embodiment.

Next, FIG. 12 is a block diagram showing the detailed composition of the staff inhibition protection section 18. As shown in this FIG. 12 the staff inhibition protection section 18 of this embodiment comprises a RAM 41, AND gate 57, an adder (2-bit adder) 58, OR gates 59, 60, one input inversion type AND gates 61, 62.

Here, the RAM 41 is same as mentioned before for FIG. 8 and FIG. 9(a), but bit number to be employed for the staff inhibition protection is set to "01", "00". The AND gate 57 outputs the staff inhibition signal ("L" pulse) when any of 2 bits of protection stage number information held respectively in the bit No. "01", "00" of the RAM 41, is "00".

Moreover, the adder 58 adds "1" to the 2 bits of protection stage number information while the OR gate 59, 60 takes logical sum of output from this adder 58 and output from the AND gate 57 respectively so as to count sequentially "00" to "11" value for each output of 2 bits until the 2 bits becomes ALL "1".

The AND gates 53 to 55 take logical product of the staff information (INC/DEC) inverted signal and output of corresponding OR gates 59, 60 and write the output of the OR gate 59, 60 into the corresponding bit No. "01", "00" of RAM 41 when the staff information is not received.

By this composition, in this staff inhibition protection section 18, when the staff information is received (INC/DEC indication is received), 2 bits of the RAM 41 is made "00" by the output from the AND gate 61, 62 and, along with the reception frame advancement, 2 bits of the RAM 41 is count up by the adder 58. Then, when either of 2 bits of the RAM 41 becomes "0", output of the AND gate 57 becomes "L" for delivering the staff inhibition signal and when the 2 bits of the RAM 41 becomes ALL "1", the output of the AND gate 57 becomes "H" to cancel the output of the staff inhibition signal. Note that this processing is also performed serially in common to all channels.

Consequently, in this case also, it contributes significantly to the substantial reduction in scale and power consumption of this apparatus 5 and, at the same time, it contributes significantly to the substantial improvement of processing capacity of this apparatus 5.

Figure 14:
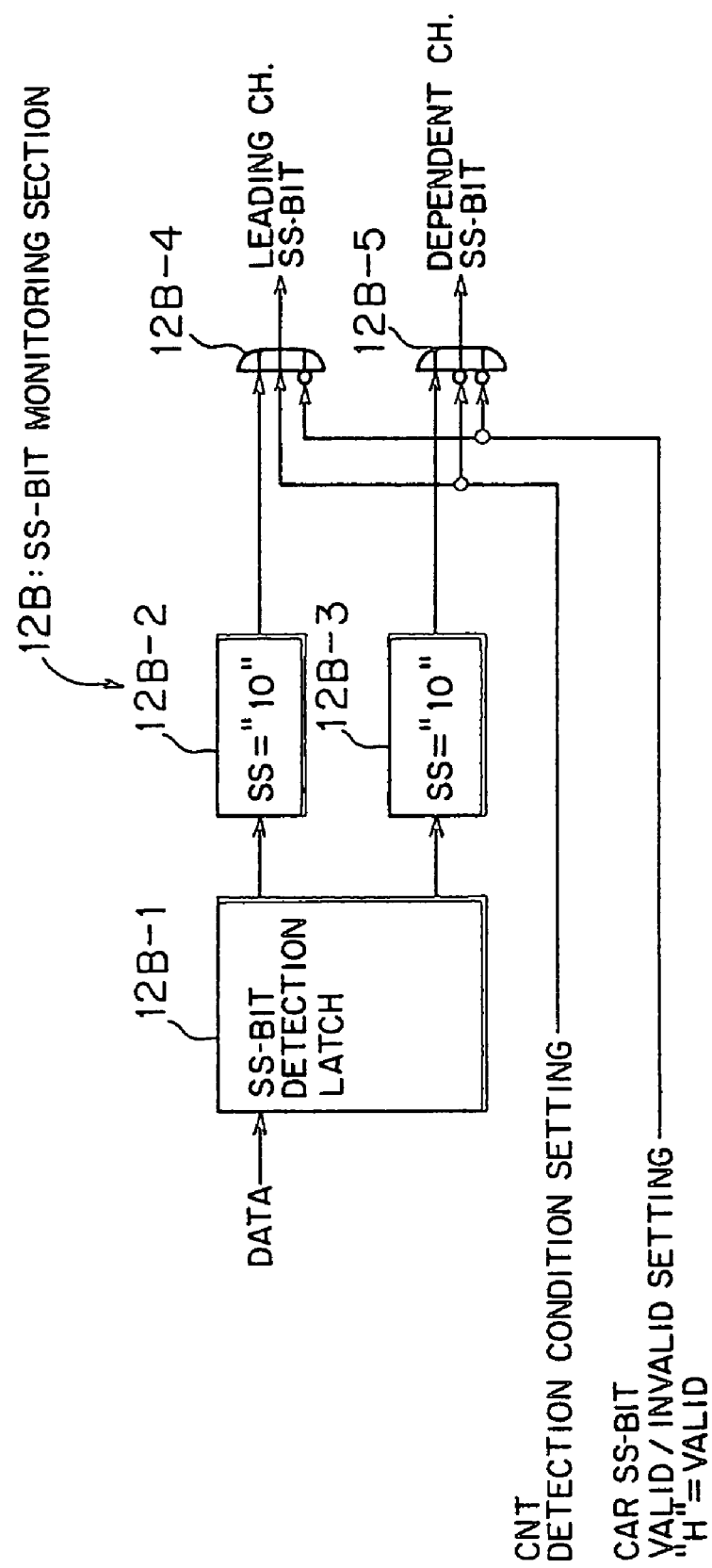
FIG. 14 is a block diagram showing the detailed composition of an SS-bit monitoring section according to this embodiment.

Next, FIG. 14 is a block diagram showing the detailed composition of the SS-bit monitoring section 12B. As shown in this FIG. 14, the SS-bit monitoring section 12B of this embodiment comprises an SS-bit latch section 12B-1, decoders 12B-2, 12B-3 and OR gates 12B-4, 12B-5.

Here, the SS-bit latch section 12B-1 latches the SS-bit (No. 5, No. 6 bit) in the reception pointer byte, the decoder 12B-2 decodes the SS-bit "10" latched in this SS-bit latch section 12B-1 for detecting the SS-bit="10", the decoder 12B-3 decodes SS-bit "00" latched in the SS-bit latch section 12B-1 for detecting SS-bit="00".

The OR gate 12B-4, 12B-5, respectively, switches over the SS-bit detection condition of leading/dependent channel in a way to include the condition of whether it should monitor the SS-bit or not ("Don't care") by validating/invalidating output from the corresponding decoder 12B-2, 12B-3 according to the detection condition setting signal (CNT setting signal) and the SS-bit validation/invalidation setting signal (CAR setting signal) defined in the following Table 1.

TABLE 1

SS-bit monitoring control setting table

| CAR | CNT | Leading ch | Dependent ch | |
|-----|-----|------------|--------------|---|
| H | H | SS = "**" | SS = "00" | ← For SONET |
|   | L | SS = "10" | SS = "**" | |
| L | H |   | "Don't care" | ← For CEPT |
|   | L |   |   | |

Provided that CAR indicates SS-bit valid/invalid setting, CNT indicates Detection condition setting, "**" indicates "Don't care".

In other words, this SS-bit monitoring section 12B enables the detection of SS-bit="10", SS-bit="00", SS-bit="Don't care" by changing the SS-bit normal reception value detection condition by the CNT/CAR setting signal for assuring the verification of leading channel, dependent channel reception state corresponding to the CONC setting.

By this composition, this SS-bit monitoring section 12B can respond to the SS-bit monitoring method in other network than SONET. For example, it can be applied to a transmission system called CEPT wherein the leading channel="10", the dependent channel="Don't care" is defined as an SS-bit normal reception while in this SONET, leading channel="Don't care", dependent channel="00" is defined as the SS-bit normal reception.

Thus, in the SS-bit monitoring section 12B according to this embodiment, by changing the SS-bit detection condition to an SS-bit detection condition appropriate for the concerned transmission system (SONET/CEPT or the like) by the CNT/CAR setting signal, it may always detect correct SS-bit irrespective of transmission system. This greatly contributes to the improvement of wide use of the present apparatus 5.

Figure 15:
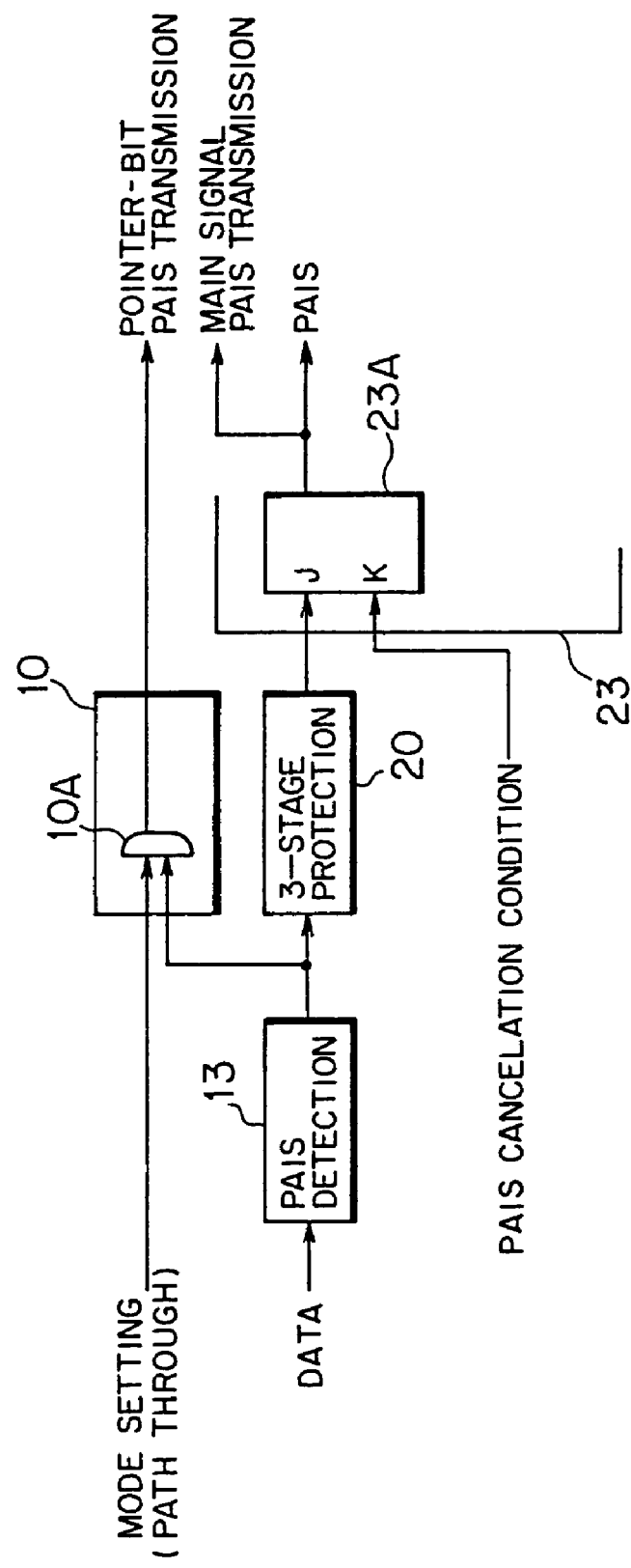
FIG. 15 is a block diagram showing the composition in respect of a path through control section according to this embodiment.

Next, FIG. 15 is a block diagram showing the composition in respect of the path through control section 10. In this FIG. 15, the same symbol as FIG. 2 refers to the same element as described for FIG. 2 respectively; in this embodiment, the path through control section 10 comprises an AND gate 10A while the alarm processing section 23 comprises a JK-FF circuit 23A.

Here, the AND gate 10A of the path through control section 10 takes logical product of the path through mode setting signal and an output from the PAIS indication detection section 13 and, upon the detection of PAIS indication by the PAIS indication detection section 13 during path through mode setting (during "H" pulse input), informs the PAIS transmission control section 9 of this PAIS indication.

On the other hand, the JK-FF circuit 23A of the alarm processing section 23 holds 3-consecutive PAIS indication detection signal from 3-stage protection section 20 until the PAIS indication is canceled for informing PAIS transmission control section 9 of this PAIS indication.

By this composition, in this reception pointer processing section 5, the PAIS detection section 13 and 3-stage protection section 20 assure the PAIS indication detection and 3-stage protection as usual transition condition, and such 3-stage protection information is input, as transition condition, into the JK-FF circuit 23A of the alarm processing section 23. As the result, the PAIS transmission request is output to the PAIS transmission control section 9 and the PAIS transmission control section 9 performs the PAIS indication processing of the main signal.

At this time, if the path through mode setting signal is input in the path through control section 10, the PAIS indication detection signal output from PAIS indication detection section 13 is validated by the AND gate 10A and the request to send as the PAIS indication only pointer byte in respect of the main signal after pointer changeover is sent to the PAIS transmission control section 9 and, as the result, the PAIS transmission control section 9 executes the PAIS indication processing only with the pointer byte.

In this PAIS indication transmission processing by path through mode setting, independent of transition state in the reception pointer processing section 5, the PAIS transmission request is output to the transmission pointer processing section 7 (PAIS transmission control section 9) during PAIS indication reception (detection). Moreover, this PAIS indication transmission processing by the path through mode setting is corresponding also to concatenation wherein frame size setting is set to the STS-3c/STS-12c, and the PAIS transmission request is output to the transmission pointer processing section 7 (PAIS transmission control section 9) individually for leading channel and dependent channel during PAIS indication reception.

Thus, the reception pointer processing section 5 may output the PAIS transmission request (PAIS state indication detection signal) as it is to the outside upon detection of PAIS indication by the PAIS indication detection section 13 allowing to inform rapidly the outside of detected PAIS indication contributing enormously to the improvement of the maintenance and operation reliability of the whole SDH transmission network.

Figures 16A, 16B:
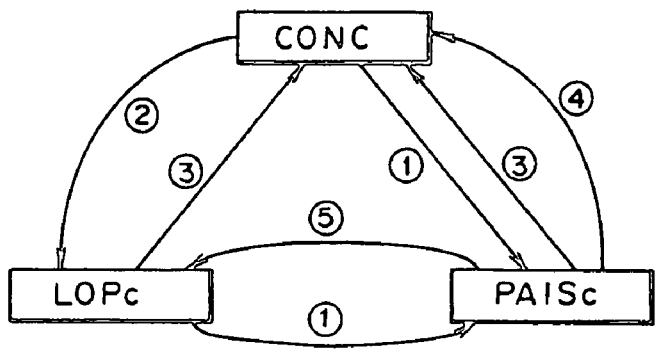

Next, FIG. 16(*a*) and FIG. 16 (*b*) are diagrams respectively illustrating the state transition of dependent channel in reception pointer detection by the pointer processing section 11. Here, the pointer processing section 11 requires, as mentioned before, 2 types of transition of leading channel and dependent channel according to the CONC setting, however, according to this embodiment, state transition as shown in these FIG. 16(*a*) and FIG. 16 (*b*) is achieved at the moment of dependent channel setting.

In other words, in this embodiment, by adding a new transition condition from the PAIS to the CONC shown by ④ in FIG. 16(*a*) and FIG. 16 (*b*), in the PAIS state, it transits to the CONC state independent of the reception state of the dependent channel upon the detection of the NDF enable in the pointer detection processing by the STS-1 corresponding to the leading channel of the time when frame kind (CONC setting) is STS-12c/3c.

Figure 17:
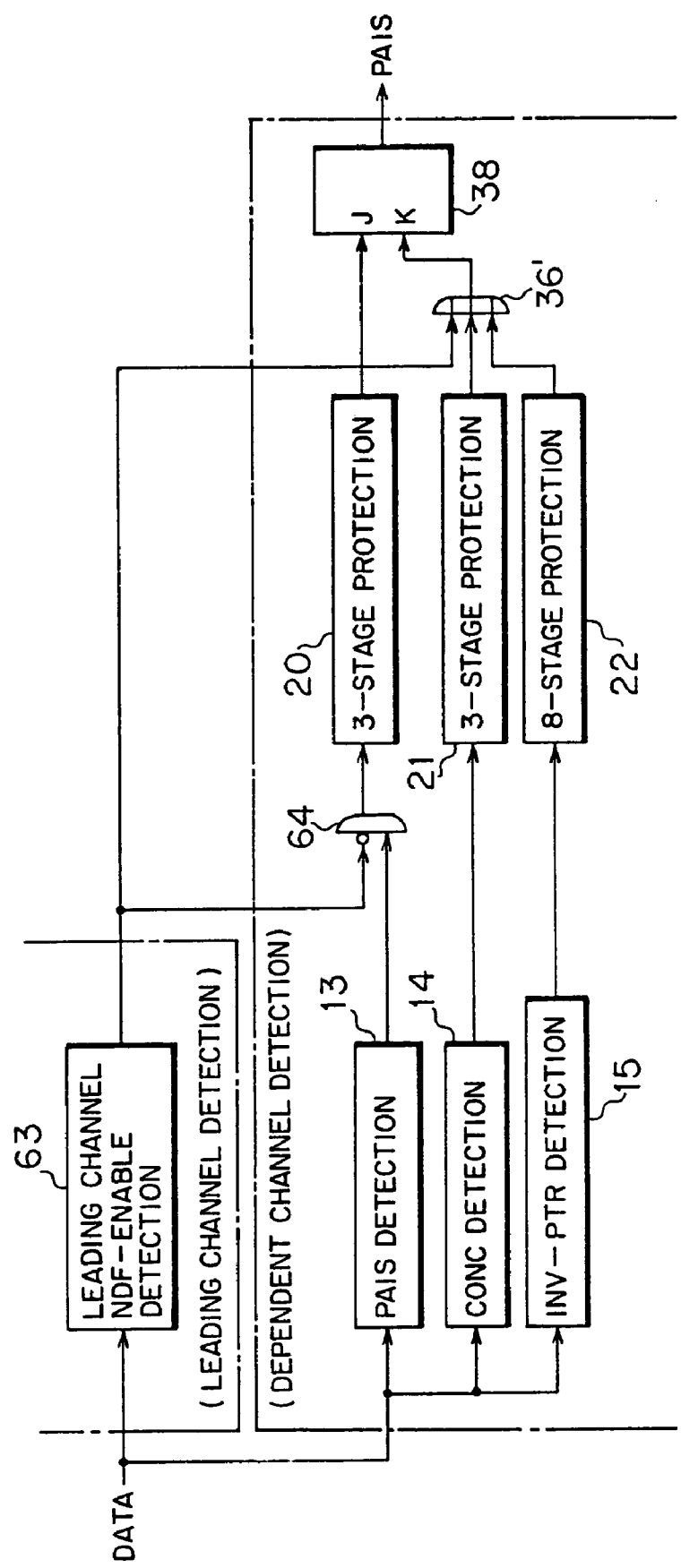
FIG. 17 is a block diagram showing the composition of the pointer processing section in respect of the state transition processing according to this embodiment.

FIG. 17 is a block diagram showing the composition of the pointer processing section 11 in respect of the state transition processing. In this FIG. 17, the same symbol as FIG. 6 refers to the same element as described for FIG. 6 respectively; 36' is an OR gate corresponding to the OR gate 36 shown in FIG. 6 while 63 is a leading channel NDF enable detection section for detecting the NDF enable for the STS-1 data corresponding to the leading channel of the time when frame kind (CONC setting) is set to STS-12c/3c and corresponds to the part comprising NDF enable detection section 19, the AND gates 28, 33 mentioned before for FIG. 6 and 64 is a one input inversion type AND gate composed to, upon detection of the NDF enable for the leading channel by the leading channel NDF enable detection section 63 in the PAIS state, mask PAIS indication detection signal detected by the PAIS indication detection section 13 with the inverted signal thereof.

By this composition, in this pointer processing section 11, at the normal state, if the PAIS indication detection signal is detected for 3-consecutive frame through the PAIS indication detection section 13 and 3-stage protection section 20, the JK-FF circuit 38 delivers the PAIS state signal to transit to the PAIS state.

In this state, for example, if the CONC indication (or invalid pointer) is detected for 3 (or 8) consecutive frames through the CONC indication detection section 14, 3-stage protection section 21 (or invalid pointer detection section 15 and 8-stage protection section 22), such detection signal is delivered to K input of the JK-FF circuit 38 through the OR gate 36' for clearing hold information of the JK-FF circuit 38 in a way to cancel the PAIS state.

Also, when the NDF enable is detected for the leading channel by the leading channel NDF enable detection section 63, the hold information of the JK-FF circuit 38 is cleared through the OR gate 36' in a way to cancel the PAIS state and in this case, the PAIS indication detection signal is masked by the AND gate 64 for clearing protection count for 3-stage protection section 20.

Namely, in the reception pointer processing section 5, when the reception transmission frame comprises a leading channel and a dependent channel linked to this leading channel, during PAIS state processing, upon reception of the NDF enable, the PAIS state of both the leading channel and the dependent channel is canceled.

As the consequence, such problem that a part (dependent channel) in data to be considered as one frame remains in the AIS state, even when the AIS state indication has been canceled, can surely be prevented assuring always a correct PAIS state processing independently of the frame composition (CONC setting) of the transmission frame in a way to improve the reliability of this apparatus 5.

Moreover, at this time, upon the reception of the NDF enable, the AND gate 64 invalidates the PAIS indication detection signal output from the PAIS indication detection section 13 and invalidates the reception itself of PAIS state indication for cancelling more securely PAIS state of the leading channel and the dependent channel in a way to assure the PAIS state processing more correctly.

Figure 18:
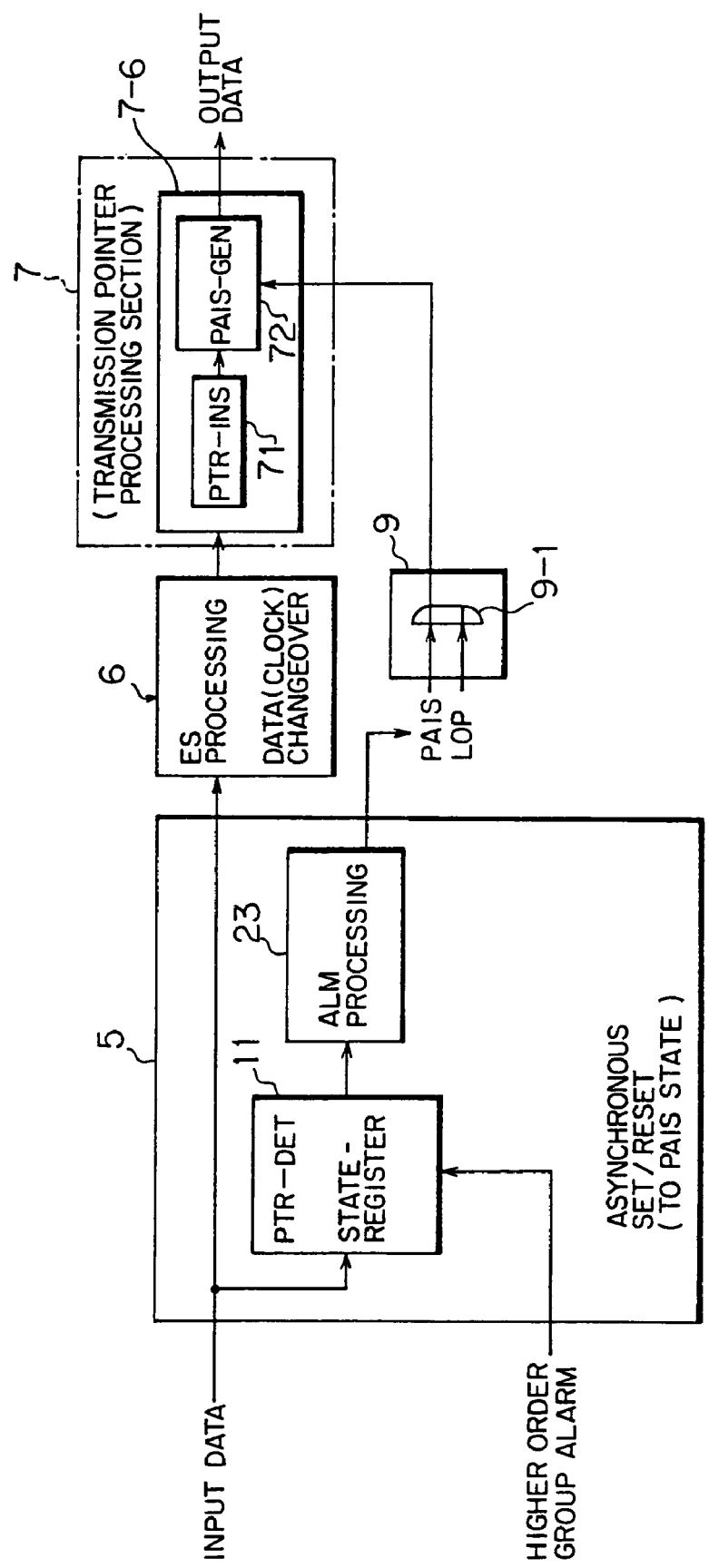
FIG. 18 is a block diagram showing the composition of the reception pointer processing section in respect of higher order group alarm function according to this embodiment.

Next, FIG. 18 is a block diagram showing the composition of the reception pointer processing section 5 in respect of higher order group alarm function. In this FIG. 18, the same symbol as FIG. 2 refers to the same element as described for FIG. 2 respectively; however, according to this embodiment, the transmission pointer processing section 7 includes as the pointer byte insertion section 7-6, a pointer insertion section 71 and a PAIS generation section 72, while the PAIS transmission control section 9 includes an OR gate 9-1 for taking logical sum of the PAIS state signal and the LOP state signal.

In this reception pointer processing section 5 shown in FIG. 18, the PAIS state signal or the LOP state signal detected through the pointer processing section 11 and the alarm processing section 23 is output to the transmission pointer processing section 7 through the OR gate 9-1 of the PAIS transmission control section 9. In the transmission pointer processing section 7, based on received PAIS state signal or the LOP state signal or the pointer insertion section 71 and the PAIS generation section 72 convert the main signal data after the clock changeover processing in the clock changeover section 6 to the PAIS state.

Upon the reception of the LOS, the LOF, the MS-AIS or other higher order group alarm detected at the reception end of the transmission line frame also, in the same way as the above processing, the transmission pointer processing section 7 assures the PAIS transmission processing; however, in this embodiment, upon the reception of higher order group alarm, the processing state by the pointer processing section 11 of reception pointer processing section 5 is compulsorily transited to the PAIS state by a control operation including asynchronous reset for controlling the PAIS transmission.

Figure 19:
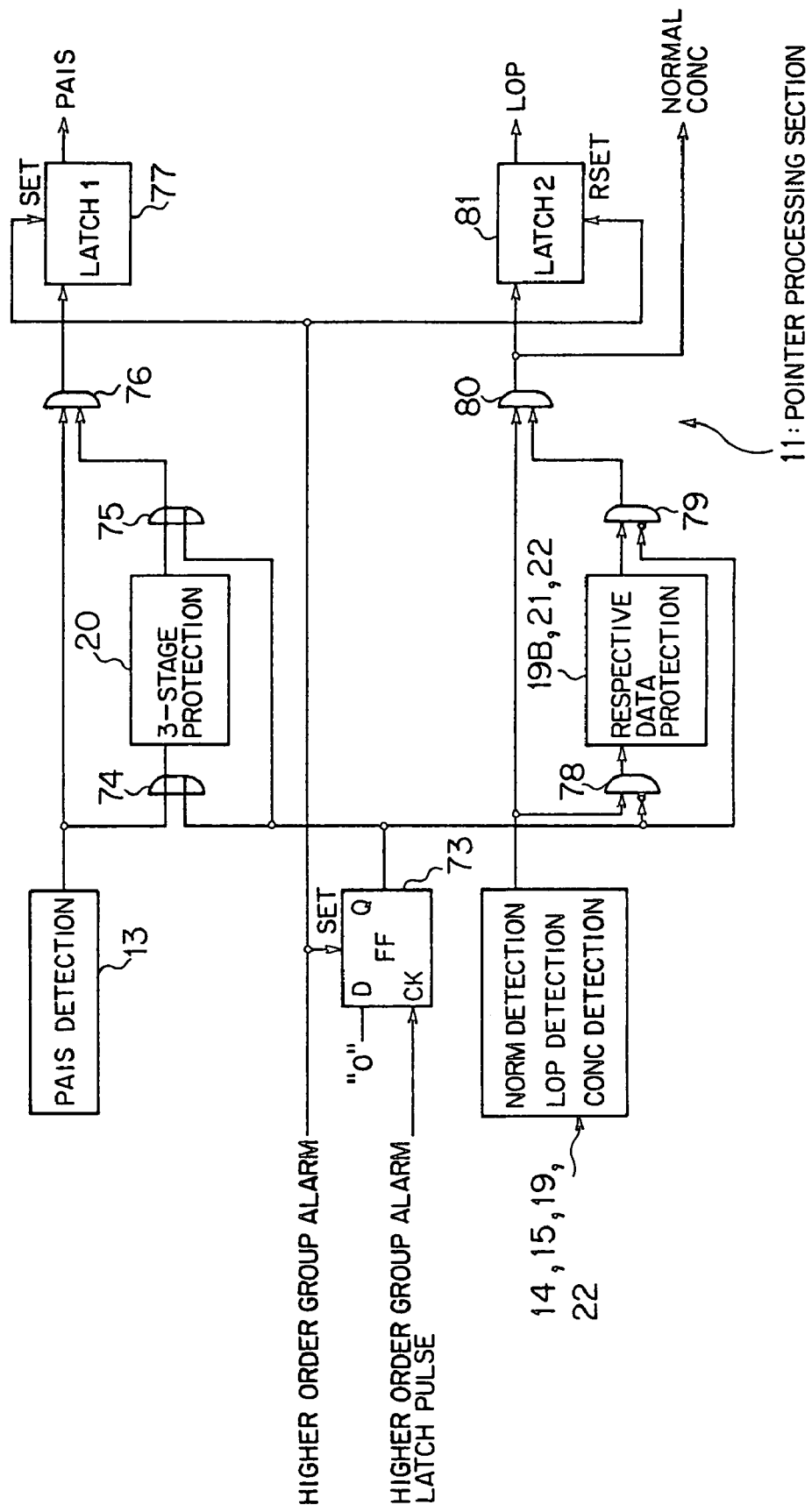
FIG. 19 is a block diagram showing the composition of the pointer processing section in respect of higher order group alarm function according to this embodiment.

FIG. 19 is a block diagram showing the composition of the pointer processing section 11 in respect of higher order group alarm function according to this embodiment. In this FIG. 19, the same symbol as FIG. 6 refers to the same element as described for FIG. 6 respectively; 73 is an FF circuit, 74, 75 are respectively OR gate, 76, 80 are respectively AND gate, 77, 81 are respectively latch section (FF circuit) and 78, 79 are respectively one input inversion type AND gate.

Here, the FF circuit 73 latches the received higher order group alarm information according to the frame cycle latch pulse (timing different from pointer byte reception cycle) while the OR gate 74 takes a logical sum of this higher order group alarm information latched by the FF circuit 73 and an output from the PAIS indication detection section and the OR gate 75 takes logical sum of output from 3-stage protection section 20 and output from the FF circuit 73.

The AND gate 76 takes a logical product of an output from the PAIS indication detection section 13 and an output from the OR gate 75 while the latch section 77 corresponding to the JK-FF circuit 38 shown in FIG. 6 latches an output (PAIS indication detection signal) of the AND gate 76; here, upon the reception of the higher order group alarm information PAIS indication detection signal is latched (SET) compulsorily (asynchronously).

The AND gate 78 takes logical product of normal pointer indication detection signal (detected by the normal pointer 3-consecutive agreement detection section 19), the LOP detection signal (detected through invalid pointer detection section 15, 8-stage protection section 22) or the CONC indication detection signal (detected by CONC indication detection section 14) and an inverted output of the FF circuit 73 in a way to validate the 3 types of detection signal only when higher order group alarm information is not received.

The AND gates 79 takes a logical product of the respective detection signals after 3-stage or 8-stage protection and the inverted output from the FF circuit 73 and its output is also validated only when higher order group alarm information is not received. Moreover, the AND gate 80, taking logical product of the normal pointer indication detection signal, the LOP detection signal or the CONC indication detection signal and an output of the AND gate 79, validates normal pointer indication detection signal, the LOP detection signal or the CONC indication detection signal only when the higher order group alarm information is not received.

The latch section 81 corresponding to the JK-FF circuit 40 shown in FIG. 6 latches the validated LOP detection signal; here, upon the reception of the higher order group alarm information, the latched LOP detection signal is reset compulsorily.

In the pointer processing section 11 composed as mentioned above, upon the reception of the higher order group alarm information, the latch section 77 is set asynchronously while the latch section 81 is reset asynchronously to transit to the PAIS state compulsorily. At this time, the FF circuit 73 latches the received higher order group alarm information at frame cycle latch pulse (timing different from pointer byte) and synchronous set of 3-stage protection section 20 and synchronous reset of protection section 19B, 21, 22 other than the PAIS is respectively performed by this latched alarm information.

To be more specific, upon the reception of the higher order group alarm information, "H" pulse is compulsorily input (written) in the 3-stage protection section 20 for the PAIS by forward OR gate 74 and "L" pulse is input in the protection sections 19B, 21, 22 for other than the PAIS compulsorily by the forward AND gate 78. Meanwhile, the output from the 3-stage protection section 20 is fixed to "H" by the rearward OR gate 75 and the output from the protection section 19B, 21, 22 is fixed to "L" by the AND gate 79 so as to prevent erroneous information from propagating to the rearward latch section 77, 81.

In other words, upon the reception of the higher order group alarm information about the received transmission frame by the pointer processing section 11, the reception pointer processing section 5 transits compulsorily to the PAIS sate so as to put the reception pointer processing state same as the PAIS reception state. As the consequence, reception pointer processing is also put into the PAIS state with alarm processing allowing to securely prevent such problem that the reception pointer processing is executed during PAIS alarm processing resulting in unstable pointer processing, so as to contribute significantly to the improvement in reliability of this apparatus 5.

Note that the higher order group alarm processing function is particularly effective when respective protection section 19B, 20 to 22 is composed of a circuit deprived of asynchronous set/reset of the RAM or the like.

Figure 20:
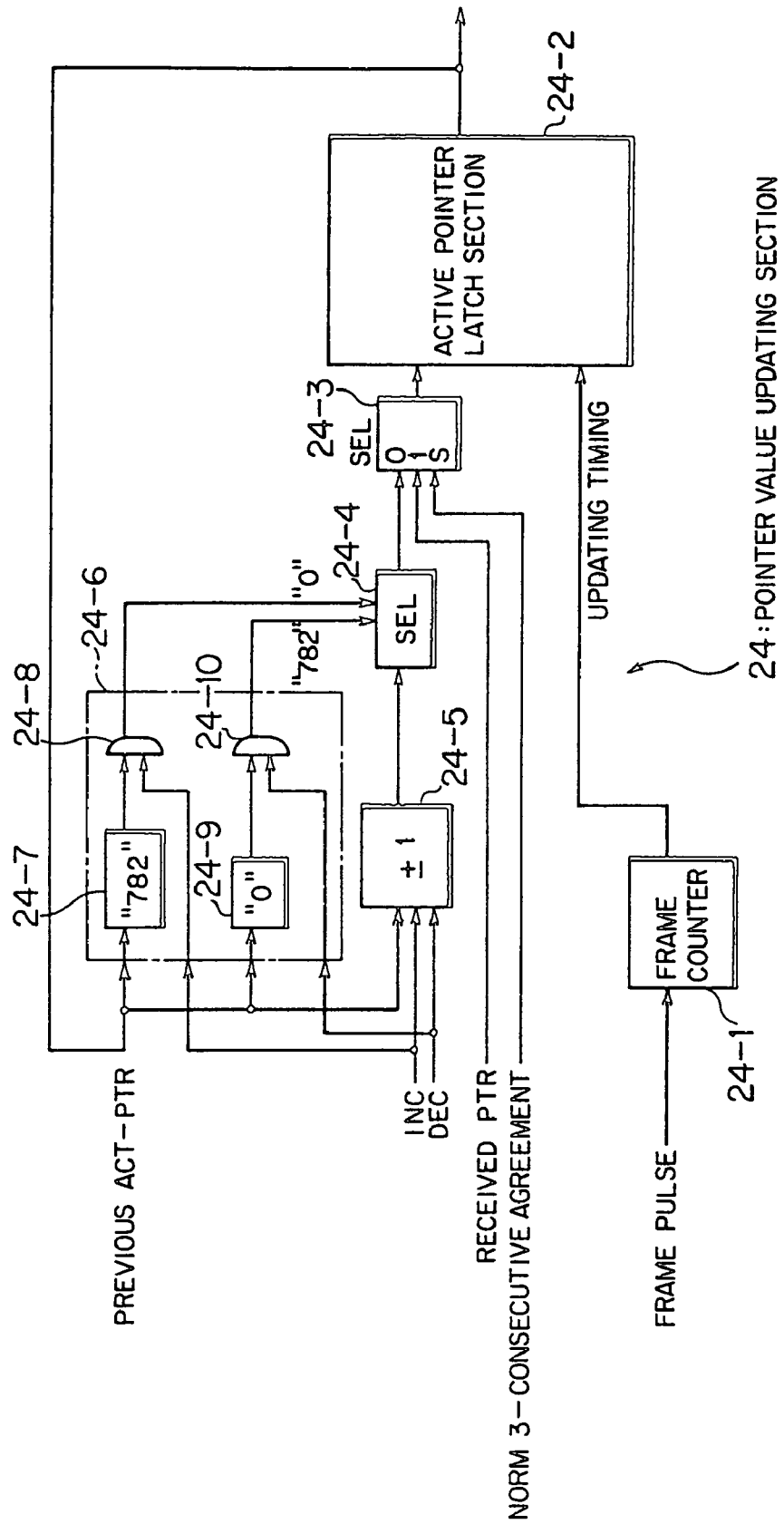
FIG. 20 is a block diagram showing the detailed composition of a pointer value updating section according to this embodiment.

Next, FIG. 20 is a block diagram showing the detailed composition of a pointer value updating section 24 mentioned before for FIG. 2. As shown in this FIG. 20, the pointer value updating section 24 according to this embodiment comprises a frame counter 24-1, an active pointer latch section 24-2, a selector (SEL) 24-3, 24-4, an adder-subtracter (±1) 24-5, and active pointer value control section 24-6.

Here, the frame counter 24-1 is a data counting counter operating synchronized with input frame pulse for outputting updating timing pulse of the active pointer value for the active pointer latch section 24-2 at a constant interval. This timing pulse is the pulse of frame cycle positioned after the pointer byte on the frame data.

The active pointer latch section 24-2 latches pointer value selected by the selector 24-3 as the active pointer value by respective channel (STS-1 frame) while the selector 24-3 selects the pointer value of the active pointer value up to the previous frame ±1 and reception pointer value for selecting the data of active pointer value up to the previous frame ±1 by the adder-subtracter 24-5 upon the reception of the INC/DEC indication and selecting the reception pointer value upon the reception of normal pointer 3-consecutive agreement or upon NDF enable reception.

Moreover, the selector 24-4 selects data from the adder-subtracter 24-5 and data "0" or "782" from the active pointer value control section 24-6 for selecting data "0" from the control section 24-6 as a new active pointer value upon reception of the INC indication when the present active pointer value is "782" and for selecting data "782" from the control section 24-6 as a new active pointer value upon reception of the DEC indication when the present active pointer value is "0".

For this purpose, the control section 24-6 comprises, as shown in this FIG. 20, decoders 24-7, 24-9 and AND gates 24-8, 24-10. When the previous frame active pointer value "782" read out from the active pointer latch section 24-2 is decoded by the decoder 24-7, upon the reception of INC indication, the AND gate 24-8 outputs data "0" and when the previous frame active pointer value "0" is decoded by the decoder 24-9, upon the reception of DEC indication, the AND gate 24-10 outputs data "782".

By the above composition, in the pointer value updating section 24 according to this embodiment, the active pointer value variation control (±1) upon reception of the INC/DEC indication, the active pointer value continuous control upon reception of the normal pointer 3-consecutive agreement (select reception pointer value), the active pointer value "782"→"0"/"0"→"782" updating control upon reception of the INC/DEC indication or the like may be performed serially in common to respective channel.

This allows to perform serially the active pointer value updating processing with the transmission rate (78 Mbps) of the received transmission frame (8 STS-12 serial data) permitting to perform rapidly the active pointer value updating processing without separating the received transmission frame by STS-1 frame and to improve substantially the processing capacity of this apparatus 5.

Figure 33:
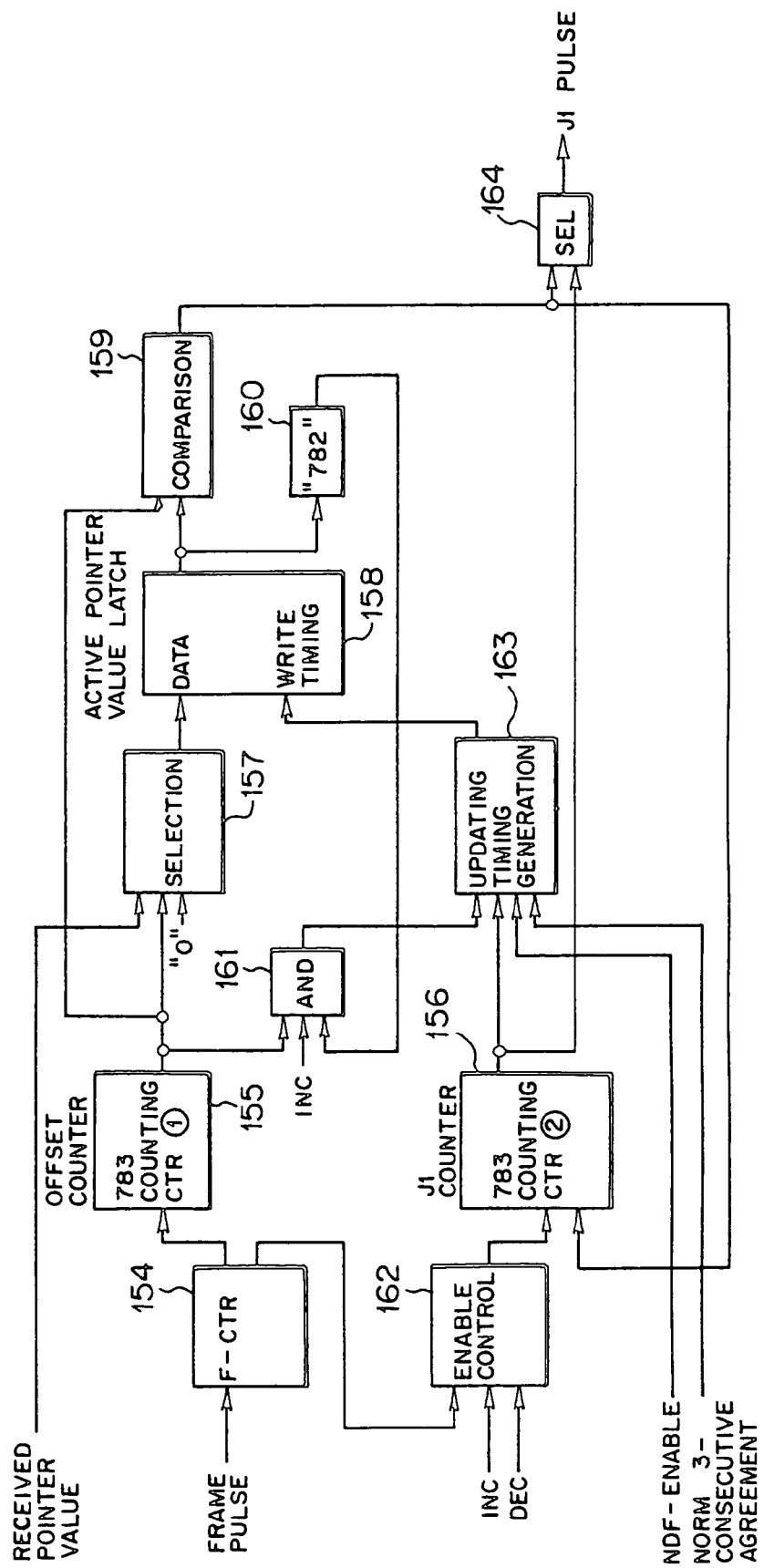
FIG. 33 is a block diagram showing an example of the pointer value updating section.

Moreover, as an offset counter 155, an updating timing generation section 163 or the like of a pointer value updating section 120 shown for instance in FIG. 33 are unnecessary, the scale of the active pointer value updating circuit in serial pointer processing composition can be miniaturized.

Figure 21:
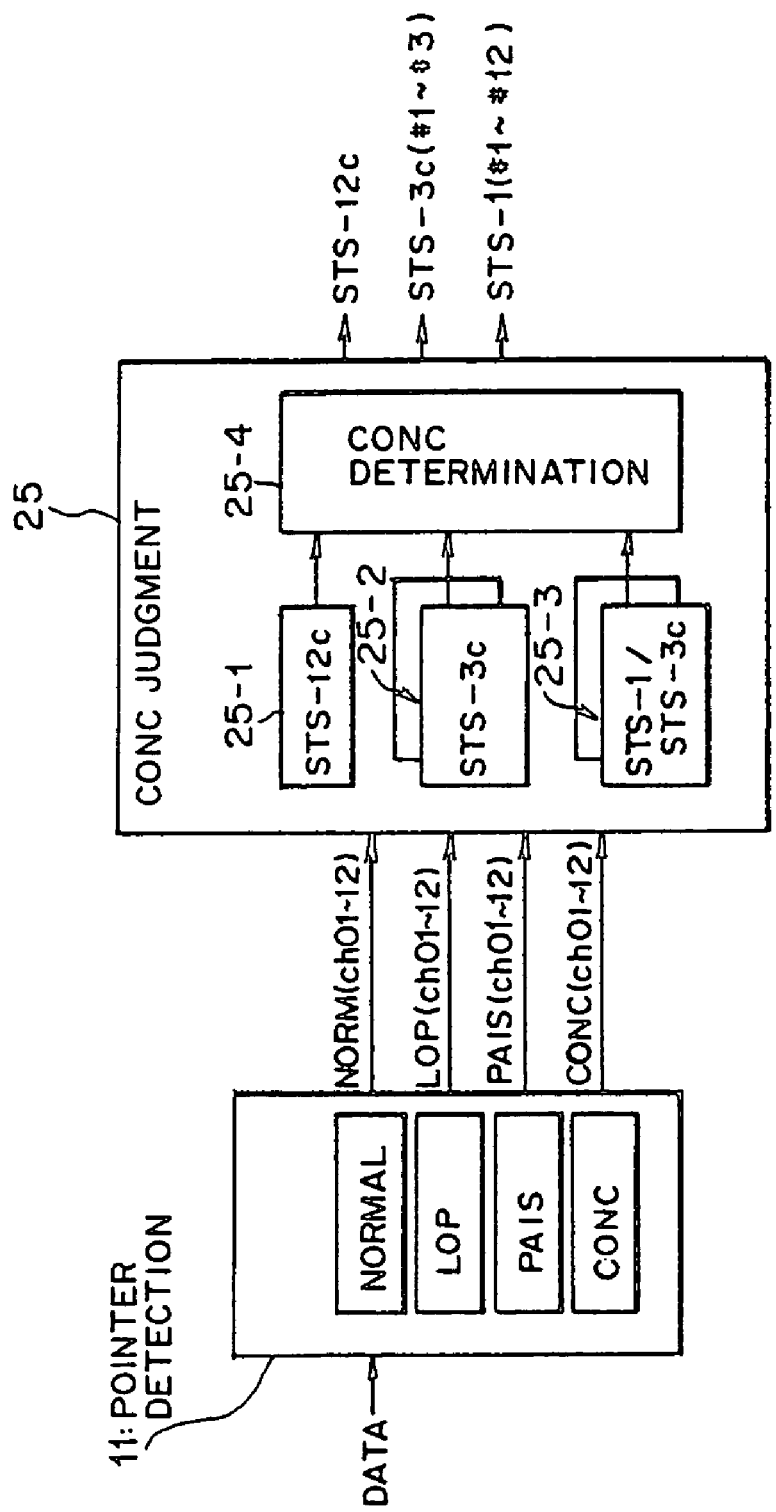
FIG. 21 is a block diagram showing the composition of CONC judgment section according to this embodiment.

Next, FIG. 21 is a block diagram showing the composition of the CONC judgment section 25 mentioned before for FIG. 2. As shown in this FIG. 21, the CONC judgment section 25 according to this embodiment comprises an STS-12c transition condition detection section 25-1, an STS-3c transition condition detection section 25-2, an STS-1 transition condition detection section 25-3 and a CONC determination section 25-4.

Here, in the respective detection section (identification condition setting section) 25-1 to 25-3 is set the identification condition (transition condition) for each frame composition of the received transmission frame (STS-12) while the CONC determination section (frame composition determination section) 25-4 determines that the received transmission frame be of frame composition (STS-1/3c/12c) corresponding to the identification condition if various pointer detection results in the pointer processing section 11 satisfy the identification condition in the detection section 25-1 to 25-3 and, in this embodiment, whether the received transmission frame satisfies the transition condition or not is judged based on respective detection state of normal pointer 3-consecutive agreement, LOP, PAIS indication, CONC indication.

Now, the transition condition shall be described in detail.

FIG. 22 (*a*) and FIG. 22(*b*) are respectively state transition diagrams illustrating frame size (frame composition) identification processing and, here, the concatenation state transition for identifying path kind of 12 channel data in the received STS-12 frame will be described.

First, in the concatenation identification processing of 12×STS-1 capacity, as shown in FIG. 22 (*a*), 3 states, the STS-12c, the STS-3c, the STS-1 may exist and there are as much transition condition to respective states. Here, the transition condition ① to ④ marked by arrows ① to ④ in FIG. 22(*a*) shall be described.

Transition condition ①: corresponds to the transition from an STS-3c/STS-1 state to an STS-12c state. In the pointer detection processing of the STS-1 level corresponding to the leading channel of 12 channels in total in the STS-12 frame, if the normal pointer 3-consecutive agreement reception state is satisfied with the leading channel and the concatenation indication 3-frame consecutive reception state is satisfied with remaining 11 channels, dependent channel, the transition to the STS-12c is realized.

Transition condition ①: corresponds to the transition from an STS-1 state to an STS-3c state. In respect of the STS-3c group (3×STS-1) corresponding to 4×STS-3c which may be contained in 12 channels in total, judgment is performed according to the detection result by the STS-1 level for each group. If normal pointer 3-consecutive agreement reception state is satisfied with the leading channel and the concatenation indication 3-frame consecutive reception state is satisfied with the dependent 2 channels, the transition to the STS-3c is realized. Provided that the transition condition ① and this transition condition ② are satisfied simultaneously, the transition condition ① supersedes and this transition condition ② will be invalidated.

Transition condition ③: corresponds to the transition from an STS-3c state to an STS-1 state and monitors independently respective group of the STS-3c. If all channels (3 channels) in the STS-3c group are in pointer state other than concatenation indication reception state (NORM, PAIS, LOP), the transition to the STS-1 is realized. However, if all channels (3 channels) are in the PAIS state (PAIS, PAIS, PAIS), it is excluded from this transition condition because it can not be considered as transition to the STS-1 state.

Transition condition ④: corresponds to the transition from the STS-12c state to the STS3c, the STS-1 state or to the STS-3c, the STS-1 mixed state. In the STS-12c state, if 1 or more of the transition condition ② or transition condition ③ is detected, it transits to the respective state of the STS-3c, the STS-1. If the transition condition ② is detected in 1 or more about the STS-3c group, other channels not satisfying this transition condition ② transit to the STS-1 state.

However, when the transition condition ① is detected in the leading group (ch01 to ch03) of the STS-3c in the STS-12c group, if neither the transition condition ② nor the transition condition ③ is satisfied with 3 groups, it may possibly rather error so the transition is not performed (in other words, if the transition condition ① and transition condition ② are satisfied simultaneously, the transition condition ① precedes). The respective transition conditions ① to ④ are summarized in FIG. 22 (b).

The CONC judgment section 25 assures the CONC judgment based on the NORM indication, the PAIS indication, the CONC indication detected independently for 12 channels in the pointer processing section 11 and the LOP detected according to these NORM indication, the PAIS indication, the CONC indication.

Figure 23:
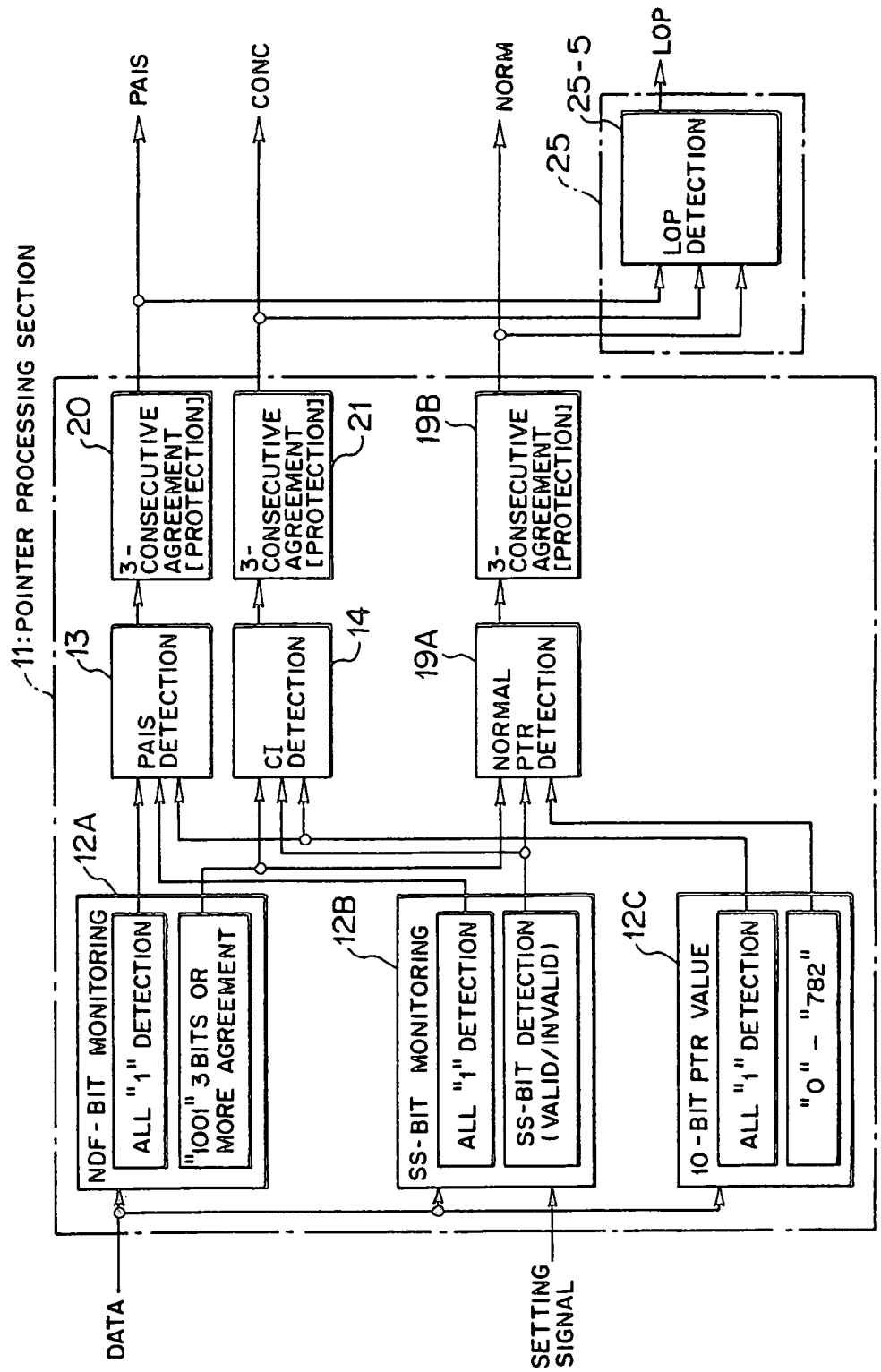
FIG. 23 is a diagram illustrating the pointer processing for CONC judgment processing according to this embodiment.

To be more specific, as shown in FIG. 23, the pointer processing section 11 detects the PAIS, the CONC, the NORM pointer state according to the respective detection results of the NDF-bit monitoring section 12A, the SS-bit monitoring section 12B, 10-bit pointer value monitoring section 12C. The PAIS indication detection section 13, 3-stage protection section 20 consider as the PAIS state when the PAIS indication is received for 3-consecutive frame. The CONC indication detection section 14, 3-stage protection section 21 consider as the CONC state when concatenation indication 3-frame consecutive reception state is satisfied.

Normal pointer indication detection section (AND gate) 19A, 3-stage protection section 19B consider as the NORM state when normal pointer indication 3-frame consecutive reception state is satisfied. In this embodiment, when state other than the PAIS indication, the normal pointer indication, the CONC indication on the pointer byte is received for 8-consecutive frame, as it is considered as the LOP state for concatenation processing, the CONC judgment section 25 is provided with the LOP detection section 25-5.

Figure 28:
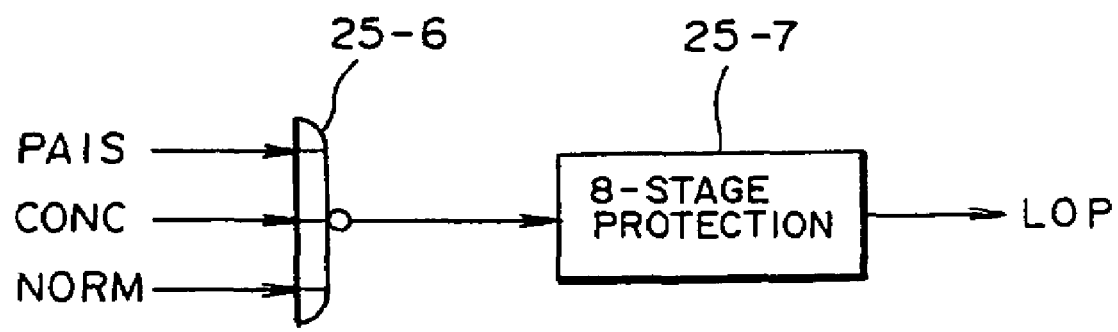
FIG. 28 is a block diagram showing the composition of a LOP detection section according to this embodiment.

As shown for example in FIG. 28, this LOP detection section 25-5 is composed using 3-input NOR gate 25-6 and 8-stage protection section 25-7 for delivering LOP detection signal when reception state other than PAIS (PAIS indication 3-frame consecutive reception), CONC (CI indication 3-frame consecutive reception), NORM (normal pointer indication 3-frame consecutive reception) in respect of the reception pointer is detected for 8-consecutive frame.

Figure 24:
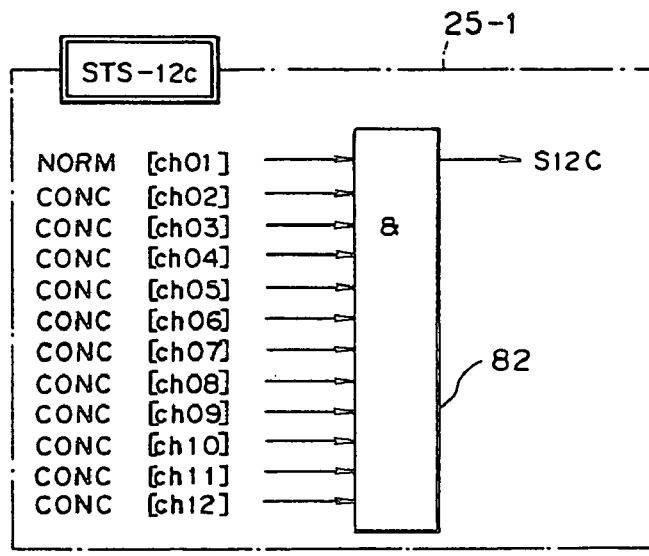
FIGS. 24 to 26 are block diagram showing the detailed composition of a transition condition detection section according to this embodiment.

More particularly, the transition condition detection section 25-1 is composed using, as shown in FIG. 24 for example, a 12-input AND gate 82 for detecting transition condition to the STS-12c. This AND gate 82 takes a logical product of the leading channel (ch01) NORM state reception and the dependent channel (ch02 to ch12) CONC state reception for detecting transition condition (S12C) to the STS-12c.

Figure 25:
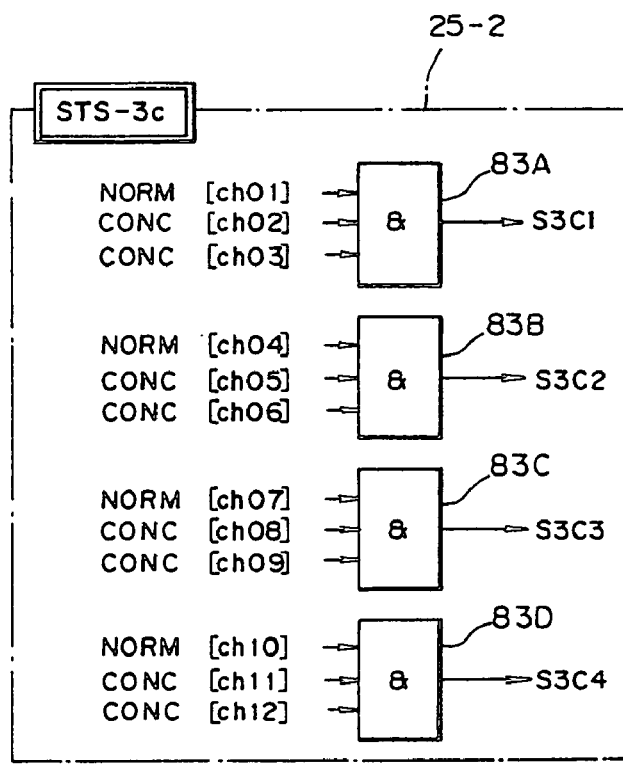

The transition condition detection section 25-2 is composed using, as shown in FIG. 25 for example, 4 AND gates 83A to 83D for detecting the transition condition (S3C1, S3C2, S3C3, S3C4) to the STS-3c individually for respective STS-3c group according to the logical product of the leading channel (ch01, ch04, ch07, ch10) NORM state reception and the dependent channel CONC state reception of the STS-3c group in STS-12c.

Figure 26:
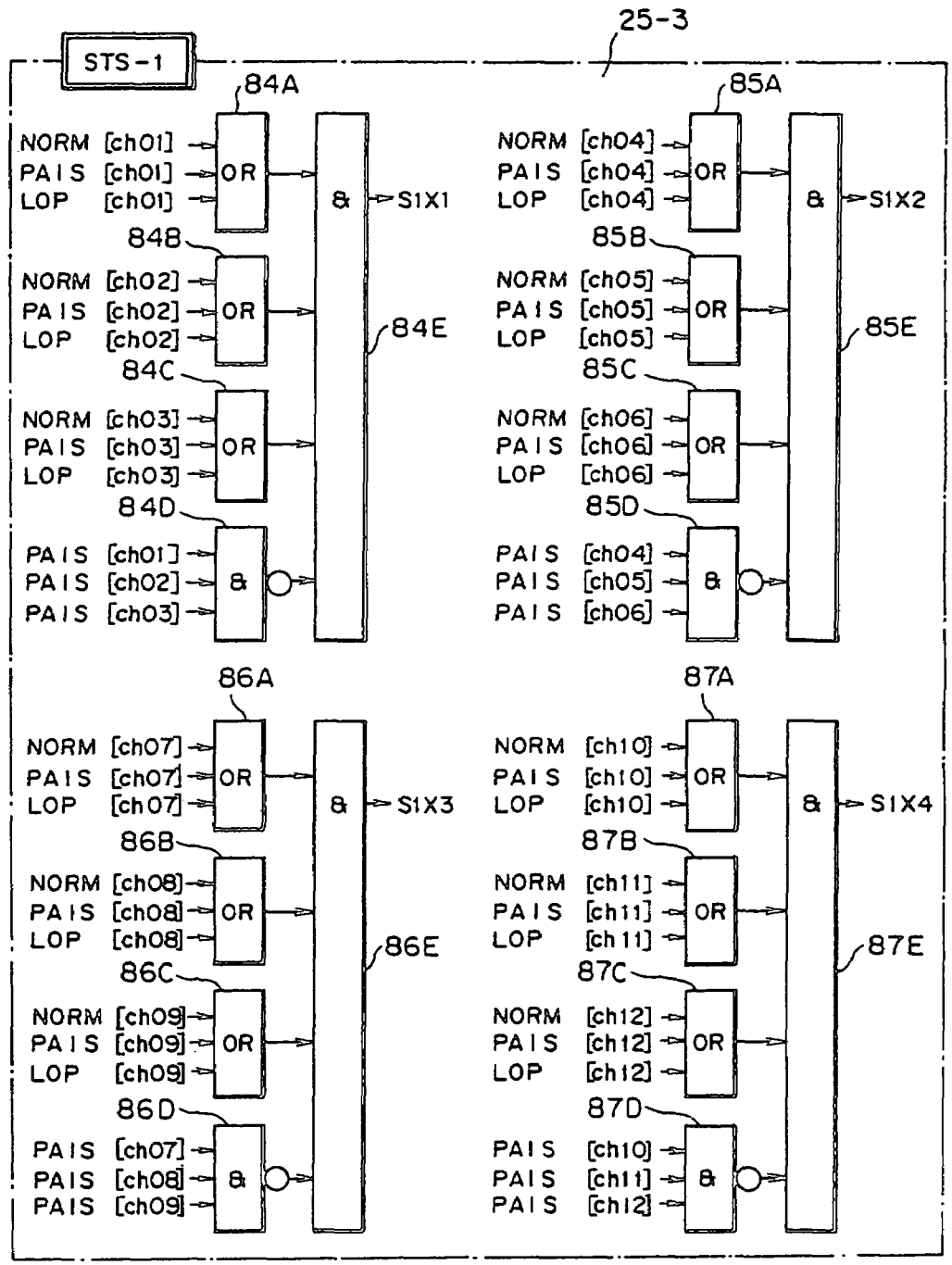

The transition condition detection section 25-3 is composed, as shown in FIG. 26, using OR gates 84A to 84C, 85A to 85C, 86A to 86C, 87A to 87C, NAND gates 84D to 87D, AND gates 84E to 87E for detecting the transition condition to the STS-1; the OR gates 84A to 87A detect other than the CONC indication state of channel (ch01, ch04, ch07, ch10) corresponding to the leading channel of the STS-3c group and the OR gates 84B to 87B, 84C to 87C detect also other than the CONC indication state of the dependent channel for detecting the STS-1 transition condition (S1X1, S1X2, S1X3. S1X4), absence of the CONC indication state in all channels by the AND gates 84E to 87E by the STS-3c group based on these results.

However, if all channels in the STS-3c group are in the PAIS reception state, as transition to the STS-1 state is invalidated, the NAND gates 84D to 87D detect the PAIS reception state of all channels while the AND gates 84E to 87E control output.

Figure 27:
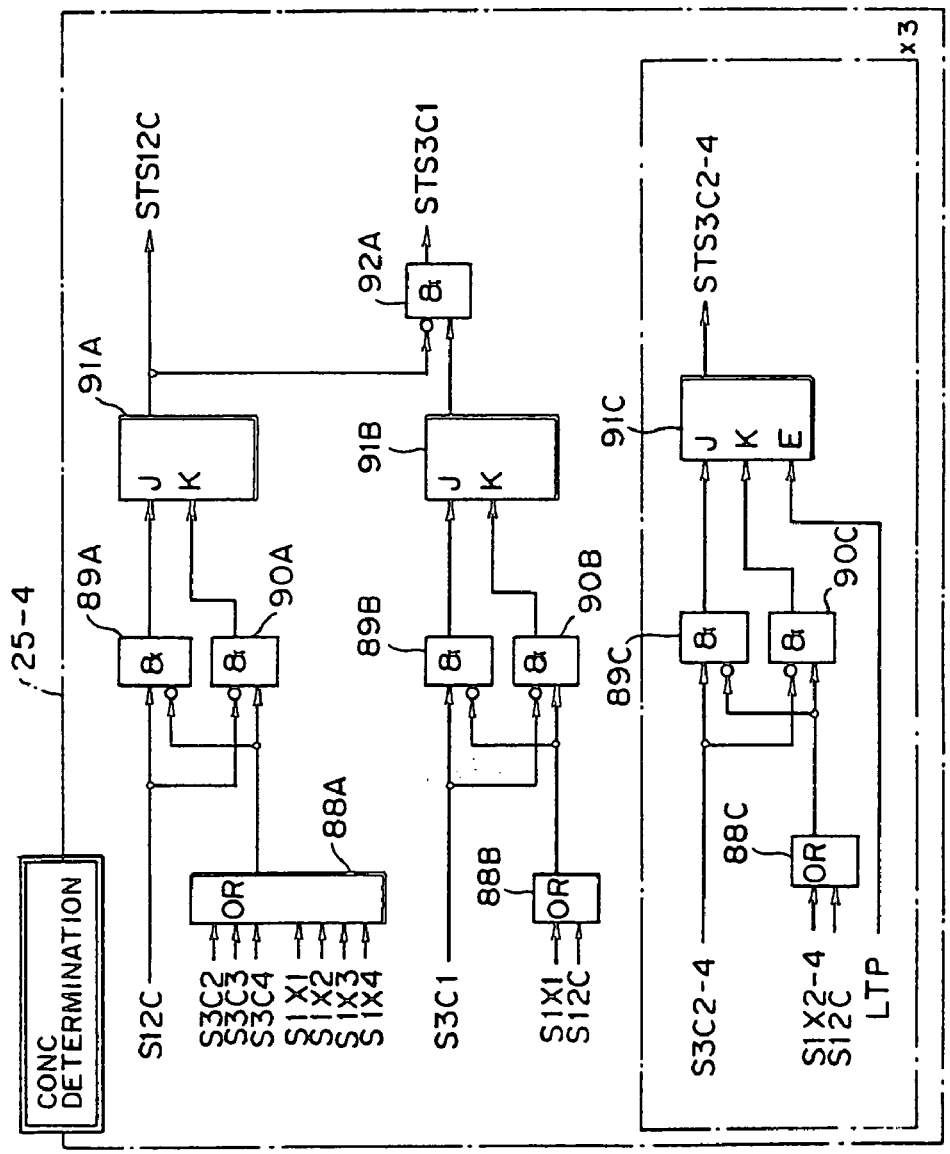
FIG. 27 is a block diagram showing the detailed composition of a CONC determination section according to this embodiment.

As shown in FIG. 27, the CONC determination section 25-4 is composed using the OR gates 88A to 88C, one input inversion type AND gates 89A to 89C, 90A to 90C, 92A, JK-FF circuits 91A to 91C for detecting the actual reception pointer state along the transition condition ① to ④ from control signal to respective state detected in the respective setting section 25-1 to 25-3 to identify the frame composition of reception STS-12 frame. Here the AND gate 92A controls for preceding the STS-12c transition condition (masks STS-3c identification signal) when the STS-12c and the STS-3c are detected simultaneously.

Thus, in the CONC judgment section 25, CONC determination section 25-4 identifies easily the frame composition of received transmission frame by determining which transition condition is met by the received transmission frame based on transition condition detection results in respective transition condition detection section 25-1 to 25-3 allowing to realize always a correct automatic identification of the frame composition of the received transmission frame.

In the CONC determination section 25-4, if any one of 4×(STS-3c)/4×(3×STS-1) satisfies the transition condition, the STS-12c state is canceled while if any one of 1×STS-12c/1×(3×STS-1) satisfies the transition condition, the STS-3c state is canceled.

Also, if any one of 3×(STS-3c)/4×(3×STS-1) satisfies the transition condition, STS-12c state is canceled.

In other words, if the state in which a first identification condition is satisfied in the transition condition detection section 25-1 to 25-3 transits to the state in which a second identification condition is satisfied, the CONC determination section 25-4 determines that the received transmission frame is of the frame composition corresponding to the second identification condition and, cancels the determination result under the first identification condition.

As the consequence, a plurality of determination results are never generated in duplication assuring, always, only one confirmation and judgment of the frame composition of the received transmission frame is generated to improve enormously the identification processing reliability.

Thus, different from a pointer detection processing by the frame size setting which has been nothing but external setting, the reception pointer processing section 5 according to this embodiment allows to detect pointer value precisely corresponding to respective size (STS-12c/STS-3c/STS-1) through the automatic identification of frame size according to the received pointer value, even when connected frame size varies.

On the other hand, time-divisional processing (serial processing) of input data on the bit rate allows to reduce frame scale and power consumption and to simplify the circuit. Moreover, the state transition equivalent to the state transition by the normal STS-1 level transition condition is realized under the transition condition of frame state for input date wherein the frame kind (size) is concatenation (STS-12c/STS-3c level or the like) state.

What is claimed is:

1. An apparatus comprising:
   a pointer processing section for processing a pointer contained in a transmission frame; and
   a frame identification section for identifying a frame composition of said transmission frame based on pointer processing result of said pointer processing section and for providing such identification result to said pointer processing section,
   wherein said pointer processing section comprises:
   a pointer detection section for detecting an NDF-bit, an SS-bit and a pointer value contained in a pointer byte of said transmission frame; and
   an invalid pointer detection section for detecting that said pointer byte is an invalid byte, based on respective detection results in said pointer section;
   in which said invalid pointer detection section is composed to change over a detection condition of a valid pointer byte according to a reception state and a frame composition of said transmission frame, and to detect as said invalid pointer byte such pointer byte not satisfying said detection condition,
   said apparatus further comprising a protection section for outputting an LOP state indication when said invalid pointer byte is detected for given number of times consecutively in said invalid pointer detection.

2. An apparatus comprising:
   a pointer processing section for processing a pointer contained in a transmission frame including one or more channel data; and
   a frame identification section performing monitoring a change in a pointer processing result of said pointer processing section for each of the channel data to identify a frame size of said transmission frame based on a monitored pointer processing result,
   wherein said pointer processing section comprises;
   a pointer detection section for detecting an NDF-bit, an SS-bit and a pointer value contained in a pointer byte of said transmission frame; and
   an AIS detection section for detecting an AIS state indication of said pointer byte, based on respective detection results in said pointer detection section;
   in which said pointer processing section is composed to be able to output outside an AIS state indication signal as it is, upon the detection of said AIS state indication signal in said AIS detection section.

3. An apparatus comprising:
   a pointer processing section for processing a pointer contained in a transmission frame; and
   a frame identification section for identifying a frame composition of said transmission frame based on pointer processing result of said pointer processing section,
   wherein said pointer processing section comprises;
   a pointer detection section for detecting an NDF-bit, an SS-bit and a pointer value contained in a pointer byte of said transmission frame; and
   an AIS detection section for detecting an AIS state indication contained in said pointer byte of said transmission frame, based on respective detection results in said pointer detection section;
   in which, when said transmission frame includes a leading frame and a dependent frame linked to said leading frame, said pointer processing section is composed to cancel an AIS state of both said leading frame and said dependent frame, upon reception of an NDF enable for said pointer byte of said transmission frame, during alarm state processing receiving said AIS state indication of said transmission frame from said alarm detection section.

4. An apparatus according to claim 3:
   wherein said pointer processing section is composed to annual said AIS state indication output from said AIS detection section, upon the reception of said NDF enable for said pointer byte of said transmission frame.

5. An apparatus comprising:
   a pointer processing section for processing a pointer contained in a transmission frame; and
   a frame identification section for identifying a frame composition of said transmission frame based on pointer processing result of said pointer processing section,
   wherein said pointer processing section comprises a pointer detection section for detecting a pointer byte of said transmission frame;
   in which said frame composition identification section comprises;
   an identification condition setting section for setting an identification condition for each frame composition of said transmission frame; and
   a frame composition determination section for determining that said transmission frame is a frame composition corresponding to said identification condition when detection results of said pointer detection section satisfy said identification condition in said identification condition setting section,
   wherein said frame composition determination second is composed to determine that said transmission frame is a frame composition corresponding to a second identification condition when detection results of said pointer detection section has satisfied a first identification condition setting section and then satisfies said second identification, and to cancel said detection results under said first identification condition.

* * * * *